United States Patent
Özden et al.

(10) Patent No.: US 11,767,704 B2
(45) Date of Patent: Sep. 26, 2023

(54) PIVOT ROOF WINDOW WITH SASH COMPRISING VACUUM INSULATED GLASS UNIT OVERLAPPING BOTTOM FRAME PROFILE

(71) Applicant: VKR HOLDING A/S, Hørsholm (DK)

(72) Inventors: Utku Ahmet Özden, Hørsholm (DK); Jacob Christian Molbo, Hørsholm (DK); Jens Troels Plesner Kristensen, Hørsholm (DK)

(73) Assignee: VKR HOLDING A/S, Horsholm (DK)

( * ) Notice: Subject to any disclaimer, the term of this patent is extended or adjusted under 35 U.S.C. 154(b) by 247 days.

(21) Appl. No.: 17/422,863

(22) PCT Filed: Jan. 13, 2020

(86) PCT No.: PCT/DK2020/050018
§ 371 (c)(1),
(2) Date: Jul. 14, 2021

(87) PCT Pub. No.: WO2020/147909
PCT Pub. Date: Jul. 23, 2020

(65) Prior Publication Data
US 2022/0098868 A1 Mar. 31, 2022

(30) Foreign Application Priority Data

Jan. 14, 2019 (DK) .............................. PA201970020
Jan. 14, 2019 (DK) .............................. PA201970021
(Continued)

(51) Int. Cl.
*E06B 3/66* (2006.01)
*E04D 13/035* (2006.01)
(Continued)

(52) U.S. Cl.
CPC ................ *E06B 3/62* (2013.01); *E04D 13/03* (2013.01); *E04D 13/031* (2013.01);
(Continued)

(58) Field of Classification Search
CPC .............. E04D 13/0354; E04D 13/035; E04D 13/0351; E04D 13/03; E04D 13/031;
(Continued)

(56) References Cited

U.S. PATENT DOCUMENTS 2,595,927 A   5/1952  Chapin
2,781,561 A   2/1957  Gifford
(Continued)

FOREIGN PATENT DOCUMENTS

CN   2835403 Y    11/2006
CN   106760122 A   5/2017
(Continued)

OTHER PUBLICATIONS

International Search Report for corresponding application PCT/DK2020/050008 filed Jan. 13, 2020; dated Apr. 3, 2020.
(Continued)

*Primary Examiner* — Andrew J Triggs
(74) *Attorney, Agent, or Firm* — CANTOR COLBURN LLP

(57) ABSTRACT

The present disclosure relates to a roof window (1) with a vacuum insulated glass unit (3). The roof window (1) comprises a VIG unit (3) and a frame arrangement (2). The frame arrangement 2 comprises a fixation frame (7) and a sash (6) fixed to the a VIG unit (3), and the sash (6) is movably connected to the fixation frame (7) by means of a hinge connection (80) so that a top end part (16*a*) of the sash (6) is configured to move inwards and a bottom end part (16*b*) of the sash is configured to move outwards when opening the sash (6) from a closed position. The bottom end
(Continued)

Figure 1:
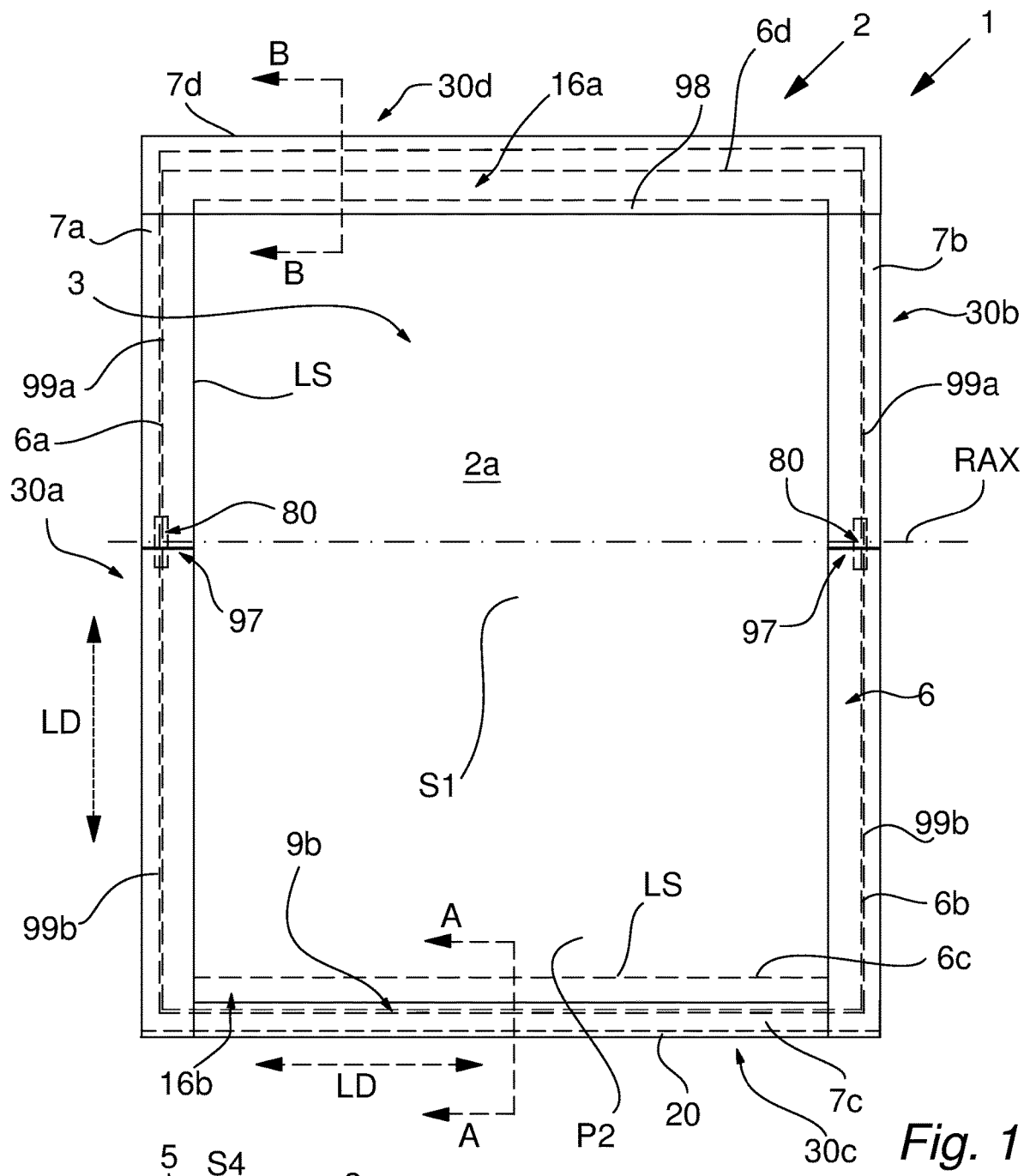

part (16b) of the sash (6) comprises an elongated, structural bottom member (6c) having an inner surface (41) facing towards the top end part (16a) of the sash, and an opposite exterior surface (42) facing away from the top end part (16a). The VIG unit (3) comprises an overlapping part (9b) where the evacuated gap (4) overlaps the elongated, structural bottom member (6c) of the sash (6). The overlapping part (9b) of the VIG unit moreover overlaps at least a part of an elongated bottom frame member (7c) of the fixation frame 7.

20 Claims, 9 Drawing Sheets

(30) Foreign Application Priority Data

| Jan. 14, 2019 | (DK) | PA201970022 |
|---|---|---|
| Jan. 14, 2019 | (DK) | PA201970023 |
| Jan. 14, 2019 | (DK) | PA201970024 |
| Jan. 14, 2019 | (DK) | PA201970025 |
| Jan. 14, 2019 | (DK) | PA201970026 |

(51) Int. Cl.
| E06B 3/677 | (2006.01) |
| E04D 13/03 | (2006.01) |
| E06B 3/62 | (2006.01) |
| E06B 3/54 | (2006.01) |
| E06B 3/02 | (2006.01) |
| E06B 3/56 | (2006.01) |
| E06B 7/23 | (2006.01) |
| E06B 3/14 | (2006.01) |

(52) U.S. Cl.
CPC ....... *E04D 13/035* (2013.01); *E04D 13/0315* (2013.01); *E04D 13/0351* (2013.01); *E04D 13/0354* (2013.01); *E06B 3/025* (2013.01); *E06B 3/14* (2013.01); *E06B 3/5427* (2013.01); *E06B 3/5454* (2013.01); *E06B 3/5481* (2013.01); *E06B 3/56* (2013.01); *E06B 3/6612* (2013.01); *E06B 3/6621* (2013.01); *E06B 3/677* (2013.01); *E06B 7/2301* (2013.01); *E06B 7/2305* (2013.01); *E06B 2003/6208* (2013.01); *E06B 2003/6229* (2013.01); *E06B 2003/6238* (2013.01); *E06B 2003/6291* (2013.01); *Y02A 30/249* (2018.01); *Y02B 80/22* (2013.01)

(58) Field of Classification Search
CPC ....... E04D 13/0315; E06B 3/62; E06B 3/025; E06B 3/14; E06B 3/5427; E06B 3/5454; E06B 3/5481; E06B 3/56; E06B 3/6612; E06B 3/6621; E06B 3/677; E06B 7/2301; E06B 7/2305; E06B 2003/6208; E06B 2003/6229; E06B 2003/6238; E06B 2003/6291; E06B 3/54; Y02A 30/249; Y02B 80/22

See application file for complete search history.

(56) References Cited

U.S. PATENT DOCUMENTS

| 3,686,795 | A | 8/1972 | La Barge | |
|---|---|---|---|---|
| 3,861,085 | A | 1/1975 | Jacob | |
| 4,134,234 | A | 1/1979 | Auger | |
| 4,134,238 | A | 1/1979 | Auger | |
| RE33,720 | E * | 10/1991 | Cummings | E04D 13/031 52/72 |
| 5,216,855 | A | 6/1993 | Richter | |
| 5,373,672 | A | 12/1994 | Schulz | |
| 6,263,623 | B1 | 7/2001 | Weiss | |
| 6,295,774 | B1 * | 10/2001 | Lindgren | E04D 13/031 52/204.1 |
| 6,435,360 | B1 | 8/2002 | Anin | |
| 6,904,725 | B1 * | 6/2005 | Hansen | E04D 13/0357 52/72 |
| 7,788,864 | B2 * | 9/2010 | Jacobsen | E04D 13/0354 52/204.5 |
| 9,151,049 | B2 * | 10/2015 | Rasmussen | E04D 13/031 |
| 9,279,282 | B2 * | 3/2016 | Koed | E04D 13/0325 |
| 9,447,627 | B2 | 9/2016 | Thompson | |
| 9,469,995 | B2 * | 10/2016 | Viig | E04D 13/0354 |
| 10,287,809 | B2 * | 5/2019 | Holm | E05F 1/1246 |
| 11,044,837 | B2 * | 6/2021 | Dong | H05K 7/1497 |
| 11,280,092 | B2 * | 3/2022 | Harbo | B32B 37/04 |
| 2007/0032972 | A1 | 2/2007 | Glover | |
| 2009/0324858 | A1 | 12/2009 | Jaeger | |
| 2012/0137607 | A1 | 6/2012 | Kristensen | |
| 2013/0101759 | A1 | 4/2013 | Jones | |
| 2014/0007396 | A1 | 1/2014 | Jones | |
| 2014/0069034 | A1 | 3/2014 | Jones | |
| 2015/0345207 | A1 | 12/2015 | Thompson | |
| 2017/0002599 | A1 | 1/2017 | Thompson | |
| 2022/0098868 | A1 * | 3/2022 | Özden | E06B 3/677 |

FOREIGN PATENT DOCUMENTS

| DE | 3202639 A1 | 8/1983 |
|---|---|---|
| DE | 102006020455 A1 | 6/2007 |
| DE | 202009016113 U1 | 5/2011 |
| DE | 10201400186 A1 | 2/2016 |
| EP | 0418461 A1 | 3/1991 |
| EP | 0421239 A2 | 4/1991 |
| EP | 0472109 A2 | 2/1992 |
| EP | 1298100 A1 | 4/2003 |
| EP | 1908914 A1 | 4/2008 |
| EP | 2169172 A2 | 3/2010 |
| EP | 2921632 A1 | 9/2015 |
| EP | 3101195 A1 | 12/2016 |
| EP | 3124733 A1 | 2/2017 |
| EP | 3170799 A1 | 5/2017 |
| FR | 2514057 A1 | 4/1983 |
| FR | 2823789 A1 | 10/2002 |
| FR | 2942843 A1 | 9/2010 |
| GB | 2492380 A | 1/2013 |
| GB | 2521419 A | 6/2015 |
| JP | 2000064732 A | 2/2000 |
| JP | 2001146881 A | 5/2001 |
| JP | 2002021437 A | 1/2002 |
| JP | 2007132637 A | 5/2007 |
| KR | 20180128659 A | 12/2018 |
| WO | 2014039642 A1 | 3/2014 |
| WO | 2014183606 A1 | 11/2014 |
| WO | 2015183863 A1 | 12/2015 |
| WO | 2017210701 A1 | 12/2017 |

OTHER PUBLICATIONS

International Search Report for corresponding application PCT/DK2020/050009 filed Jan. 13, 2020; dated Mar. 30, 2020.
International Search Report for corresponding application PCT/DK2020/050010 filed Jan. 13, 2020; dated Mar. 25, 2020.
International Search Report for corresponding application PCT/DK2020/050011 filed Jan. 13, 2020; dated Apr. 7, 2020.
International Search Report for corresponding application PCT/DK2020/050012 filed Jan. 13, 2020; dated Apr. 9, 2020.
International Search Report for corresponding application PCT/DK2020/050013 filed Jan. 13, 2020; dated Mar. 19, 2020.
International Search Report for corresponding application PCT/DK2020/050014 filed Jan. 13, 2020; dated Apr. 14, 2020.
International Search Report for corresponding application PCT/DK2020/050015 filed Jan. 13, 2020; dated Mar. 27, 2020.
International Search Report for corresponding application PCT/DK2020/050016 filed Jan. 13, 2020; dated Apr. 1, 2020.

(56) References Cited

OTHER PUBLICATIONS

International Search Report for corresponding application PCT/DK2020/050017 filed Jan. 13, 2020; dated Feb. 18, 2020.
International Search Report for corresponding application PCT/DK2020/050018 filed Jan. 13, 2020; dated Feb. 18, 2020.
Written Opinion for corresponding application PCT/DK2020/050008 filed Jan. 13, 2020; dated Apr. 3, 2020.
Written Opinion for corresponding application PCT/DK2020/050009 filed Jan. 13, 2020; dated Mar. 30, 2020.
Written Opinion for corresponding application PCT/DK2020/050010 filed Jan. 13, 2020; dated Mar. 25, 2020.
Written Opinion for corresponding application PCT/DK2020/050011 filed Jan. 13, 2020; dated Apr. 7, 2020.
Written Opinion for corresponding application PCT/DK2020/050012 filed Jan. 13, 2020; dated Apr. 9, 2020.
Written Opinion for corresponding application PCT/DK2020/050013 filed Jan. 13, 2020; dated Mar. 19, 2020.
Written Opinion for corresponding application PCT/DK2020/050014 filed Jan. 13, 2020; dated Apr. 14, 2020.
Written Opinion for corresponding application PCT/DK2020/050015 filed Jan. 13, 2020; dated Mar. 27, 2020.
Written Opinion for corresponding application PCT/DK2020/050016 filed Jan. 13, 2020; dated Apr. 1, 2020.
Written Opinion for corresponding application PCT/DK2020/050017 filed Jan. 13, 2020; dated Feb. 18, 2020.
Written Opinion for corresponding application PCT/DK2020/050018 filed Jan. 13, 2020; dated Feb. 18, 2020.

* cited by examiner

PIVOT ROOF WINDOW WITH SASH COMPRISING VACUUM INSULATED GLASS UNIT OVERLAPPING BOTTOM FRAME PROFILE

The present disclosure relates to a pivot roof window comprising a vacuum insulated glass (VIG) unit.

BACKGROUND

Vacuum insulated glass (VIG) units provides several advantages such as good heat insulation properties and reduced thickness. A VIG unit may typically comprise glass sheets kept separated by support structures arranged in an airtight and evacuated gap between the glass sheets. To provide an airtight gap, an edge sealing is applied along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing.

Patent document U.S. Pat. No. 9,447,627B2 discloses a window frame unit for a vacuum insulated glass unit. A base member and a glazing member of a frame provides a recess wherein a distal edge of a VIG unit is arranged. The recess is disclosed to be designed to accommodate distortion of the VIG unit rather than constraining the VIG unit at the distal edge of the VIG unit. This is obtained by a resilient, flexible tab of a glazing member that is/are snapped into engagement with a base member of the frame, so that the tabs may allow the glazing member to pivot to accommodate distortion of the VIG unit. Patent documents U.S. Pat. No. 6,435,630 B1 and JP2007132637 discloses other solutions for holding a VIG unit. Patent document EP2169172 B1 discloses a further solution where a frame holds a VIG unit by means of an adhesive at a surface facing a sash. US2012137607 discloses a window frame and a possible VIG where the pane is moulded in an element.

It however appears that problems still exists when arranging a VIG unit in a frame to provide for example a roof window.

The present disclosure provides one or more solutions where a VIG unit is arranged in a frame of a roof window, which may e.g. help to improve or ensure the lifetime, such as the estimated lifetime, of the VIG unit. It may also or alternatively provide a more simple mechanical solution for holding a VIG unit in/at a frame of a roof window, provide a solution that may be used under varying climatic conditions, and/or provide a solution which is advantageous from a manufacturing point of view.

SUMMARY

VIG units are normally made from glass sheets kept separated by support structures such as pillars arranged in an airtight and evacuated gap between the glass sheets. To provide the airtight gap, an edge sealing is provided along the glass sheet edges so as to enclose the gap between the glass sheets. This edge seal may be made from e.g. a glass frit material such as low melting point glass frit material which is applied along the edges of a glass sheet and then subsequently heated in order to melt the glass material to provide an airtight and strong edge sealing. The edge seal may alternatively be made from a metal seal which is heated to a melting point and then cooled to cure.

The gap(s) between the glass sheets are normally evacuated by means of an evacuation cup connected to an evacuation pump, and the evacuation cup is arranged to cover an evacuation hole in one of the glass sheets for the VIG unit, which is then sealed after the evacuation of the gap. Alternatively, the gap may be evacuated in an evacuation chamber enclosing the entire VIG unit. The gap is normally evacuated to below $10^{-3}$ bar, such as below $10^{-4}$ bar, e.g. to about or below $10^{-3}$ mbar.

The VIG unit is subjected to significant temperature differences $\Delta T$ between the VIG unit glass sheets due to the good insulation capabilities of the VIG unit. As the edge seal for sealing the gap between the VIG unit glass sheets is normally very stiff in nature, the temperature difference $\Delta T$ between the glass sheets causes the VIG unit to deflect (also known as thermal bending, thermal deflection or thermal distortion), as the hotter glass sheet of the VIG unit will expand compared to the colder of the glass sheets.

VIG units according to aspects of the present disclosure may in aspects of the present disclosure provide a $U_g$-value at or below 0.7 W/(m²K), such as at or below 0.6 W/(m²K), e.g. at or below 0.5 W/(m²K) such as below 0.4 W/(m²K), and such VIG units may suffer from increased thermal deflection due to the good insulation provided by means of the VIG unit. This low $U_g$-value may be obtained by means of the evacuation of the gap between the VIG glass sheets, e.g. in combination with one or more one or more of

- One or more low-e coatings such as thin tin dioxide or thin silver layers or any other suitable low e-coating layers at e.g. the inner surface(s) of the glass sheets of the VIG unit facing the VIG unit gap,
- a larger/increased support structure distance, such as above 3 or above 4 centimetres, for example above 5 centimetres, between neighbouring support structures in the VIG unit gap to reduce the number of potential "cold-bridges" provided by the support structures,
- by using support structures of a material having a low thermal conductivity and/or a small size,
- By providing a 3-layer VIG unit (i.e. with two evacuated gaps placed between a middle glass sheet and a glass sheets arranged at and parallel to opposite surfaces of the middle glass sheet),
- By providing a "floating" glass pane inside an evacuated gap, and with support structures placed at each side of the "floating" glass pane and the outer VIG unit glass sheets. (by "floating" is understood that the glass pane is not fixed to/by edge sealing material, instead the edge of the floating glass pane is placed with a gap between the edge and the edge seal part that encloses the evacuated gap between the outer two VIG glass sheets)

It is understood that the support structures may generally be arranged in a repeated pattern such as a grid with parallel rows and columns having substantially the same distance between neighbouring support structures. In other aspects of the present disclosure, the support structures may be arranged in a pattern that has been determined/adapted based on a predetermined stress profile. This stress profile may e.g. be established by means of tests and/or computer simulations of a VIG unit. In this case, the distance between neighbouring support structures may be different at certain areas of the VIG unit across the VIG unit. For example so that there is a larger distance between some neighbouring support structures where the stress conditions are lower, and possibly a higher number of support structures where the stress conditions may be, or potentially become, higher.

The present disclosure relates to a roof window. The roof window comprises a vacuum insulated glass unit comprising a first glass sheet and a second glass sheet, wherein an evacuated gap is placed between the first and second glass sheets. A plurality of support structures are distributed in the evacuated gap, and an edge seal encloses the evacuated gap. The roof window moreover comprises a frame arrangement comprising a fixation frame and a sash fixed to the a vacuum insulated glass unit. The sash is movably connected to the fixation frame by means of a hinge connection so that a top end part of the sash is configured to move inwards and a bottom end part of the sash is configured to move outwards when opening the sash from a closed position. The bottom end part of the sash comprises an elongated, structural bottom member having an inner surface facing towards the top end part of the sash, and an opposite exterior surface facing away from the top end part. The vacuum insulated glass unit comprises an overlapping part, so that the evacuated gap overlaps the elongated, structural bottom member of the sash. The overlapping part of the vacuum insulated glass unit moreover comprises a part which overlaps at least a part of an elongated bottom frame member of the fixation frame.

The present disclosure may provide a space saving solution for providing a window which has enhanced insulating capabilities and at the same time provides desirable aesthetic advantages and good weather protection.

Cold bridges may be caused by the edge sealing of the vacuum insulated glass (VIG) unit, such as a rigid edge sealing such as a solder glass or metal solder edge sealing. Such edge sealings provides strong and wear resistant bonding capabilities for sealing the evacuated gap, but comes with the disadvantage of being a rather good conductor of heat, which may cause issues at and near the edges of the VIG unit. As the VIG unit overlaps the elongated, structural bottom member of the sash and moreover overlaps an elongated bottom frame member of the fixed frame, this helps to reduce or even substantially avoid cold bridges that transfer cold to the visible part of the VIG unit when the sash is in a closed position, at the bottom area of the frame.

In one or more aspects of the present disclosure, one or more resilient air tightening gaskets is/are provided between the overlapped elongated, structural bottom member of the sash and the elongated bottom frame member of the fixation frame. This may help to improve tightness such as air tightness, and to improve heat insulation of the frame when the sash is in a closed position In one or more aspects of the present disclosure, the vacuum insulated glass unit comprises a part extending beyond the outermost edge of said elongated structural bottom member of the sash which faces away from the top end part of the sash, and wherein said part of the vacuum insulated glass unit extending beyond the outer edge moreover overlaps at least a part of the elongated bottom frame member when the sash is in a closed position.

This may help to enable providing desired aesthetic appearances of the roof widow, such as a more exposed exterior part/surface of the VIG unit at the bottom part of the roof window. At the same time, it helps to improve heat insulation of the roof window as the edge sealing is moved further away from the interior surface of the sash that faces the frame opening.

In one or more aspects of the present disclosure, the edge seal at the overlapping part of the vacuum insulated glass unit extending beyond the structural bottom member of the sash may be placed opposite the part of the bottom frame member of the fixation frame which is overlapped by the vacuum insulated glass unit when the sash is in a closed position.

In one or more aspects of the present disclosure, the elongated bottom frame member may comprise a surface facing a frame opening defined by the fixation frame, and an opposite, exterior surface facing away from the frame opening. Here, the surface facing the frame opening may be arranged to face and be opposite to the exterior surface of the structural bottom member of the sash when the sash is in a closed position.

This may be relevant in order to provide improved water tightness and/or insulation advantages.

In one or more aspects of the present disclosure, the vacuum insulated glass unit may comprise a sealed evacuation opening. Also or alternatively the vacuum insulated glass unit may in one or more aspects of the present disclosure comprise one or more getter arrangements inside the evacuated gap. The sealed evacuation opening and/or the getter may here in aspects of the present disclosure be placed at the overlapping part of the VIG unit.

The overlapping part of the VIG unit at the bottom part of the sash may provide a larger space and hence freedom for placing the getter(s) and/or the sealed evacuation opening so that this/these is/are less visible.

For example, in one or more aspects of the present disclosure, one or more of said one or more getter arrangements and/or the sealed evacuation opening may be arranged at the part of vacuum insulated glass unit that overlaps the structural bottom member of the sash.

This may enable hiding these parts of the VIG unit at least from the interior of the building, and/or help to provide a protection function.

In aspects of the present disclosure, the vacuum insulated glass unit may comprise a sealed evacuation opening and/or a getter arrangement inside the evacuated gap which is/are placed at the part of vacuum insulated glass unit which extends beyond an outer edge of said structural bottom member of the sash and overlaps at least a part of the elongated bottom frame member.

This may enable hiding these parts of the VIG unit at least from the interior of the building.

In one or more aspects of the present disclosure, the evacuated gap has a width which is below 0.5 mm, such as below 0.3 mm, for example about 0.2 mm or about 0.1 mm.

A VIG unit enables providing a more narrow/thin pane construction. Hence, the evacuated gap may more easily extend over the exterior frame and hence provide a roof window with good insulating properties as the edge seal is moved further away from the frame opening and the interior surface of the sash.

In one or more aspects of the present disclosure, the distance from the bottom edge surface of the vacuum insulated glass unit and to a line of sight through the vacuum insulated glass unit is above 25 mm, such as above 30 mm, for example above 40 mm. This distance is determined parallel to an outer major surface of the vacuum insulated glass unit, in a direction perpendicular to the longitudinal extent of the bottom edge surface of the VIG unit.

This may e.g. provide a good heat insulation solution and help to reduce condensation at the visible interior surface of the VIG unit as the VIG unit edge is moved further away from the frame opening.

In one or more aspects of the present disclosure, the distance from the bottom edge surface of the vacuum insulated glass unit and to a line of sight through the vacuum insulated glass unit is between 25 mm and 200 mm, such as between 30 mm and 150 mm, such as between 40 mm and 100 mm, wherein the distance is determined parallel to an outer major surface of the vacuum insulated glass unit, in a direction perpendicular to the longitudinal extent of the bottom edge surface.

In one or more aspects of the present disclosure, a cladding wall may be connected to the vacuum insulated glass unit and configured to extend over a part of an exterior surface of the bottom frame member which faces away from the frame opening when the sash is in a closed position.

This helps to provide an improved water tightening of the window at the bottom part of the roof window.

In one or more aspects of the present disclosure, an overlapping cover, such as a hiding cover plate, is fixed to the vacuum insulated glass unit and/or the sash. This overlapping cover may be arranged to cover and hide at least the part of the vacuum insulated glass unit which overlaps the elongated bottom frame member. This may help to cover and hide a part of the overlapping part of the VIG unit. This may be relevant in order to hide a part of the frame from an outside view through the VIG unit and/or may help to provide a location where a getter and/or sealed evacuation opening may be well hidden.

The overlapping cover may comprise or be connected to the cladding wall. This may provide a mechanically simple and yet cost efficient water protection solution.

In one or more aspects of the present disclosure, the overlapping cover may be fixed to the exterior surface of the vacuum insulated glass unit, by means of an adhesive such as a structural adhesive. This may provide an aesthetically and yet water tight solution. The adhesive may be a strip of adhesive material extending in the longitudinal direction of the cover parallel to the bottom edge surface of the VIG unit to provide improved water tightness. A resilient gasket strip such as a rubber or elastomer gasket may also or alternatively be added, e.g. in case that the adhesive may comprise discretely arranged adhesive parts, or generally in order to further improve water tightness between the overlapping cover and the VIG unit.

In one or more aspects of the present disclosure, a masking may be provided to mask a part of the vacuum insulated glass unit which overlaps the structural bottom member of the sash and/or the part that overlaps the elongated bottom frame member of the fixation frame.

This may help to provide a solution that enables aesthetic advantages. The masking may be arranged at the VIG unit such as at an outer surface of the VIG unit facing the overlapped part(s) of the frame. The masking reduces or prevents a look through the vacuum insulated glass unit at the location of the masking (thereby hiding the frame construction) but enables that exterior surface of the VIG unit at the lower part of the VIG unit overlapping the frame may appear more uninterrupted and flush with the remaining part of the exterior VIG unit surface.

Said masking may in one or more aspects of the present disclosure be a sheet, plate or coating, such as a ceramic coating. In case of the ceramic coating, it may be provided as a coating burned into/onto the glass during a tempering of the glass sheet. The sheet, plate or coating may e.g. be attached to an outer major surface of the VIG unit such as to a surface of a lamination glass of the VIG unit.

In one or more aspects of the present disclosure, a top end part of the frame arrangement may comprises a top cladding device configured to extend from the fixation frame and over the top end part of the sash, at least when the sash is in a closed position.

This helps to provide enhanced water tightening in a roof window such as a pivot roof window.

In one or more aspects of the present disclosure, the top end part of the sash comprises an elongated, structural top member having an inner surface facing towards the bottom end part of the sash, and an opposite outer surface facing away from the bottom end part, wherein the vacuum insulated glass unit comprises an overlapping part which overlaps the structural top member of the sash. This improves heat insulation properties of the window and reduces condensation issues caused by the edge seal of the VIG unit.

The VIG unit may in aspects of the present extend at least 25 cm, such as at least 35 cm, for example between 25 mm and 10 cm in over the top member of the sash.

In one or more aspects of the present disclosure, the vacuum insulated glass unit comprises a part extending beyond the outermost part of said outer surface of the structural top member of the sash.

This may help to provide a space saving sash solution that at the same time helps to provide enhanced heat insulation and helps to reduce condensation issues at the interior surface of the VIG unit.

In one or more aspects of the present disclosure, upper and lower elongated water cover members may be configured to cover elongated side sash members and elongated side members of the fixation frame. This may at least apply when the sash is in a closed position.

These water cover members may extend along the elongated side members of the sash and frame and help to provide improved water tightness. The upper and lower elongated water cover members may preferably be arranged in continuation of each other when the sash is in a closed position.

The upper elongated water cover members may in aspects of the present disclosure be stationary and fixed to the fixation frame, and the lower elongated water cover members may be fixed to the sash or the vacuum insulated glass unit and thereby configured to move together with the sash.

This enables good water tightening of a pivot roof window.

In one or more aspects of the present disclosure, the vacuum insulated glass unit comprises a tempered, such as thermally tempered, glass sheet providing the exterior glass sheet of the VIG unit. The VIG unit may in one or more aspects of the present disclosure be a laminated vacuum insulated glass unit comprising a lamination glass sheet configured to face the interior of the building.

This helps to provide a more safe roof window solution as tempered glass sheets are more resistant and less likely to break, and/or since the lamination glass (connected to a major surface of a glass sheet of the VIG unit by means of a lamination interlayer such as a PVB or EVA interlayer) ensures that glass will not fall down in case the VIG unit breaks due to e.g. an outer force striking and breaking the VIG unit.

In one or more aspects of the present disclosure, a handle for opening and closing the sash may be attached, such as pivotably attached, to the elongated, structural top member of the sash.

In one or more aspects of the present disclosure, the exterior surface of the vacuum insulated glass unit may comprise an exposed, visible surface area which is larger, such as at least 1% larger, for example at least 3% larger, such as at least 5% larger than the visible, exposed surface area of the interior major surface of the vacuum insulated glass unit when the sash is in a closed position.

This may help to enable a desired visual appearance of the roof window.

In one or more aspects of the present disclosure, the vacuum insulated glass unit is attached to the elongated bottom sash member by means of a bonding seal attached to an interior major surface of the vacuum insulated glass unit. This may e.g. provide a mechanically simple solution in order to assure a sufficiently strong and long lasting solution. Additionally this enables providing an increased exposed exterior surface area of the VIG unit.

The bonding seal may in aspects of the present disclosure comprise a structural adhesive such as a silicon adhesive, a silane-terminated polyurethane (SPUR) adhesive or a Modified-Silyl Polymer (SMP) adhesive.

Such structural adhesive may provide a strong and yet long lasting solution for the bonding seal.

In one or more aspects of the present disclosure, said bonding seal may have a thickness above 4 mm such as above 5 mm for example above 6 mm, at a temperature difference between the two glass sheets of the vacuum insulated glass unit of substantially 0° C.

The bonding seal may in aspects of the present disclosure have a thickness between 4 mm and 13 mm, such as between 5 mm and 10 mm, for example between 6 mm and 10 mm, at a temperature difference between the glass sheets of the VIG unit of 0° C. This thickness of the bonding seal material is measured in a direction substantially perpendicular to the major surface between the surface of the VIG unit to which it is attached. The bonding material may in further aspects of the present disclosure be partly (further) compressed and/or partly stretched or less compressed along the longitudinal extent of the bonding seal by the VIG unit in response to a thermal deflection of the VIG unit caused by a temperature difference between the glass sheets that encloses the evacuated gap. The largest compression of the bonding seal along the bonding seal, due to the thermal deflection of the VIG unit may in aspects be at least 1 mm such as at least 2 mm at a temperature difference between the glass sheets enclosing the evacuated gap of 40° C. or 65° C.

In one or more aspects of the present disclosure, the hinge connection may comprises a centre hinge connection.

A space may in one or more aspects of the present disclosure be provided between the overlapped elongated bottom frame member of the fixation frame and the vacuum insulated glass unit. The bottom edge of the vacuum insulated glass unit may here be allowed to provide a deflection curve/arc between the corners where the bottom edge terminates, in response to a temperature difference ΔT between the two glass sheets of the vacuum insulated glass unit so that the part of the vacuum insulated glass unit arranged opposite to the space is allowed move into and/or away from said space.

In one or more aspects of the present disclosure, the largest total edge deflection of any of the edges of the vacuum insulated glass unit at a temperature difference between the two glass sheets of 65° C. as compared to the vacuum insulated glass unit at a temperature difference of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative aspects of the present disclosure, the largest total edge deflection of any of the edges of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

In aspects of the present disclosure, a minimum distance between an outer major surface of the vacuum insulated glass unit and surfaces of elongated members of the sash facing the outer major surface of the vacuum insulated glass unit, is at least 4 mm such at least 5 mm, for example at least 6 mm at a temperature difference ΔT between the two glass sheets of the vacuum insulated glass unit of substantially 0° C. This may e.g. provide sufficient space for the VIG unit edge to thermally deflect relative to the frame/sash. This minimum distance is measured in a direction perpendicular to the VIG unit surface.

FIGURES

Figure 2:
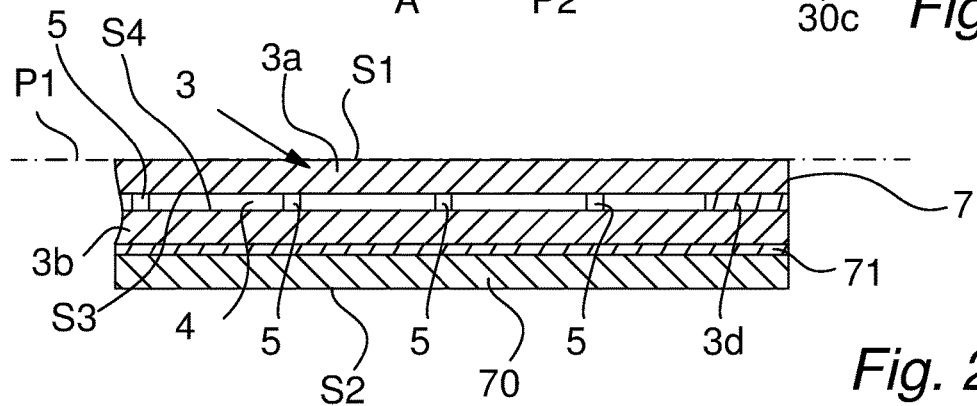
Figure 3:
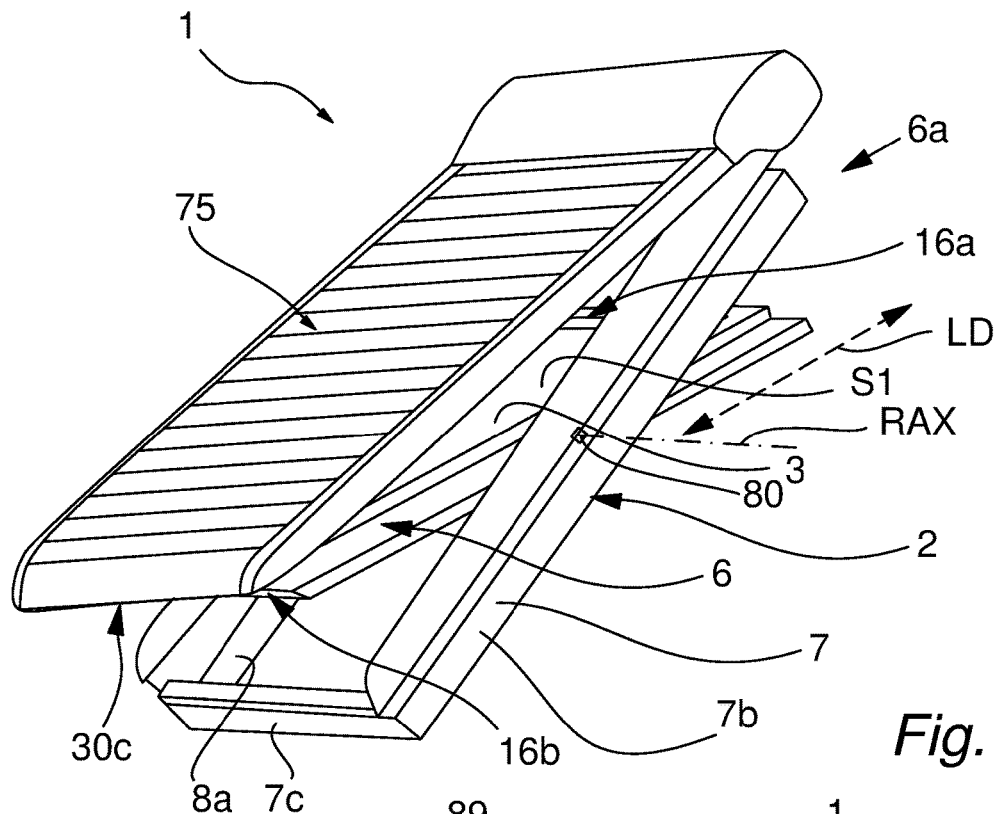
Figure 4A:
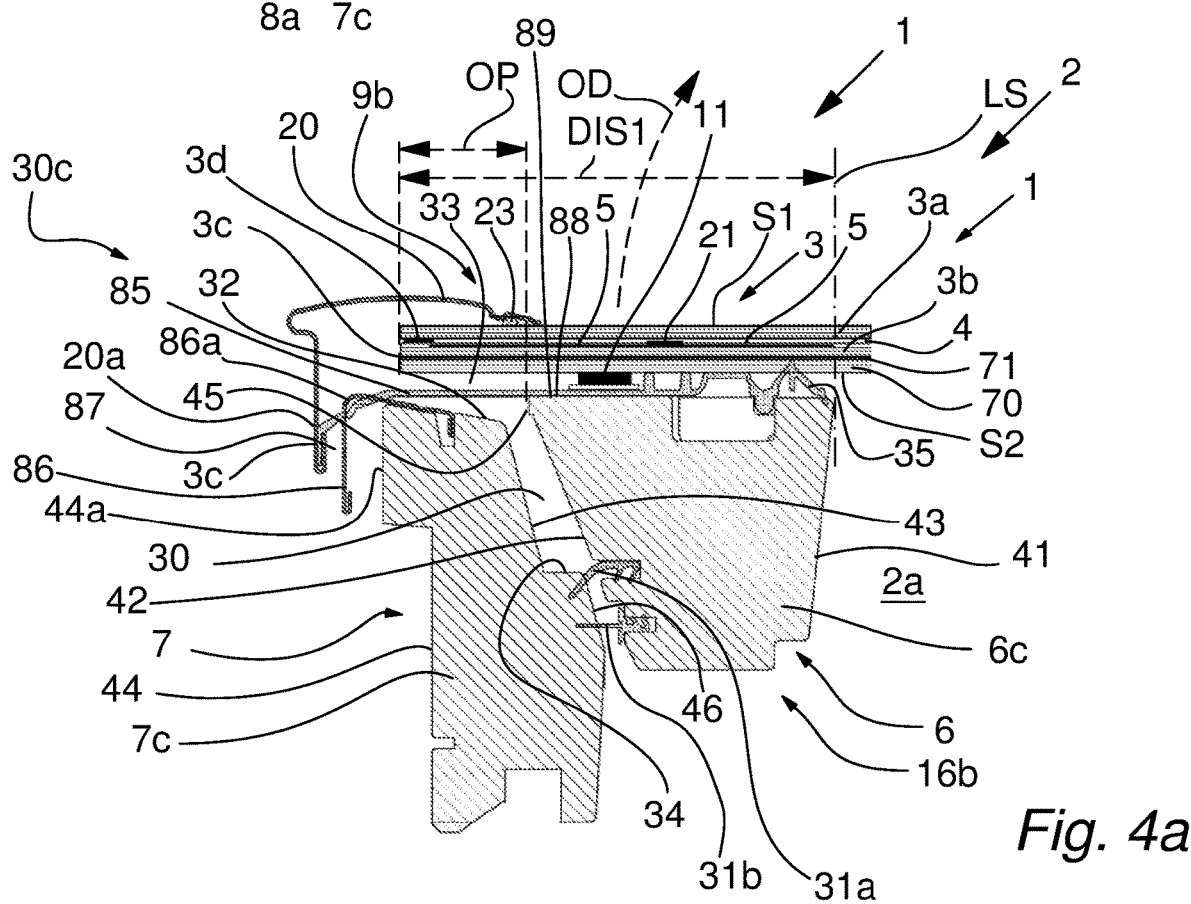
Figure 4B:
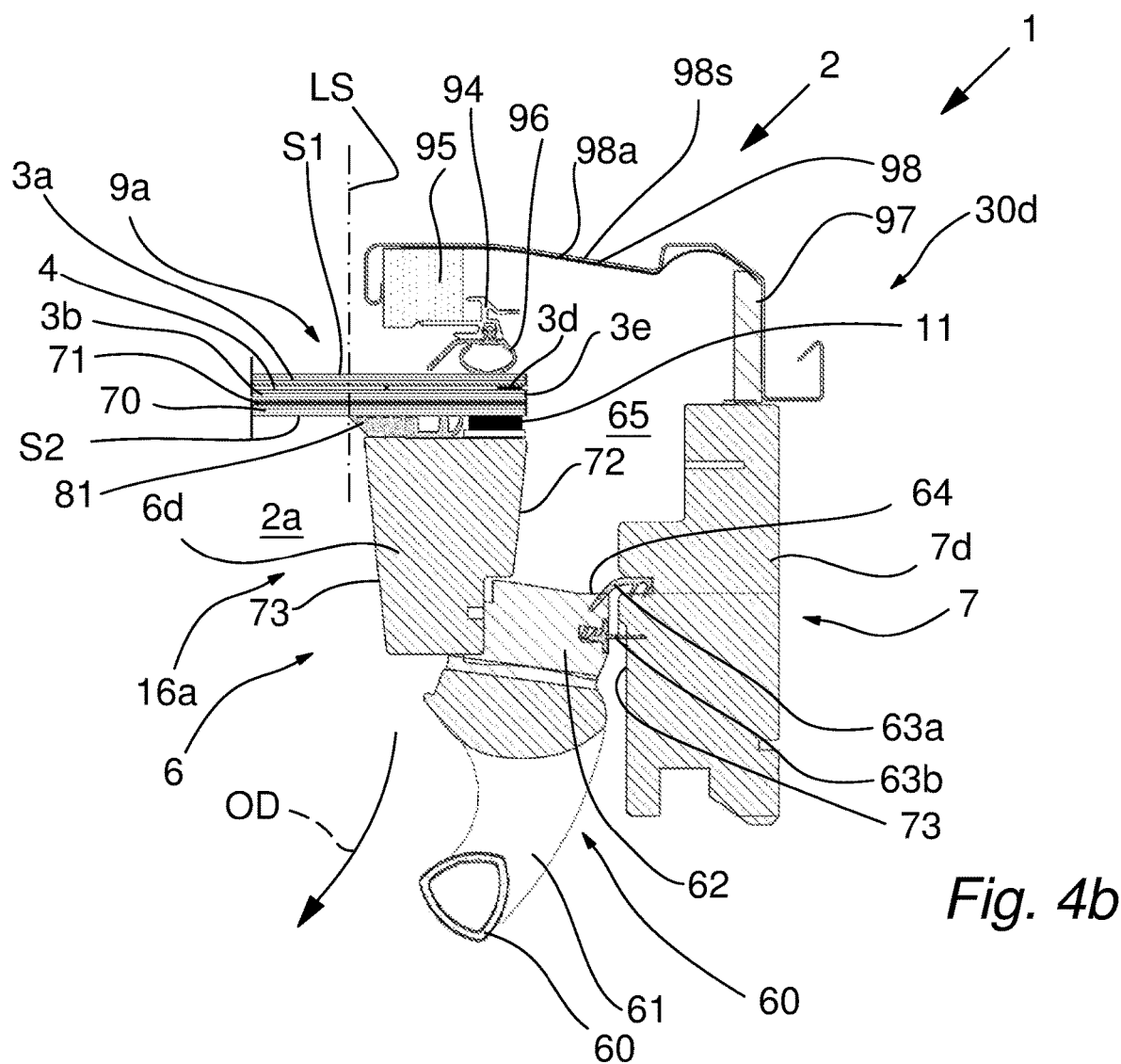
Figure 5:
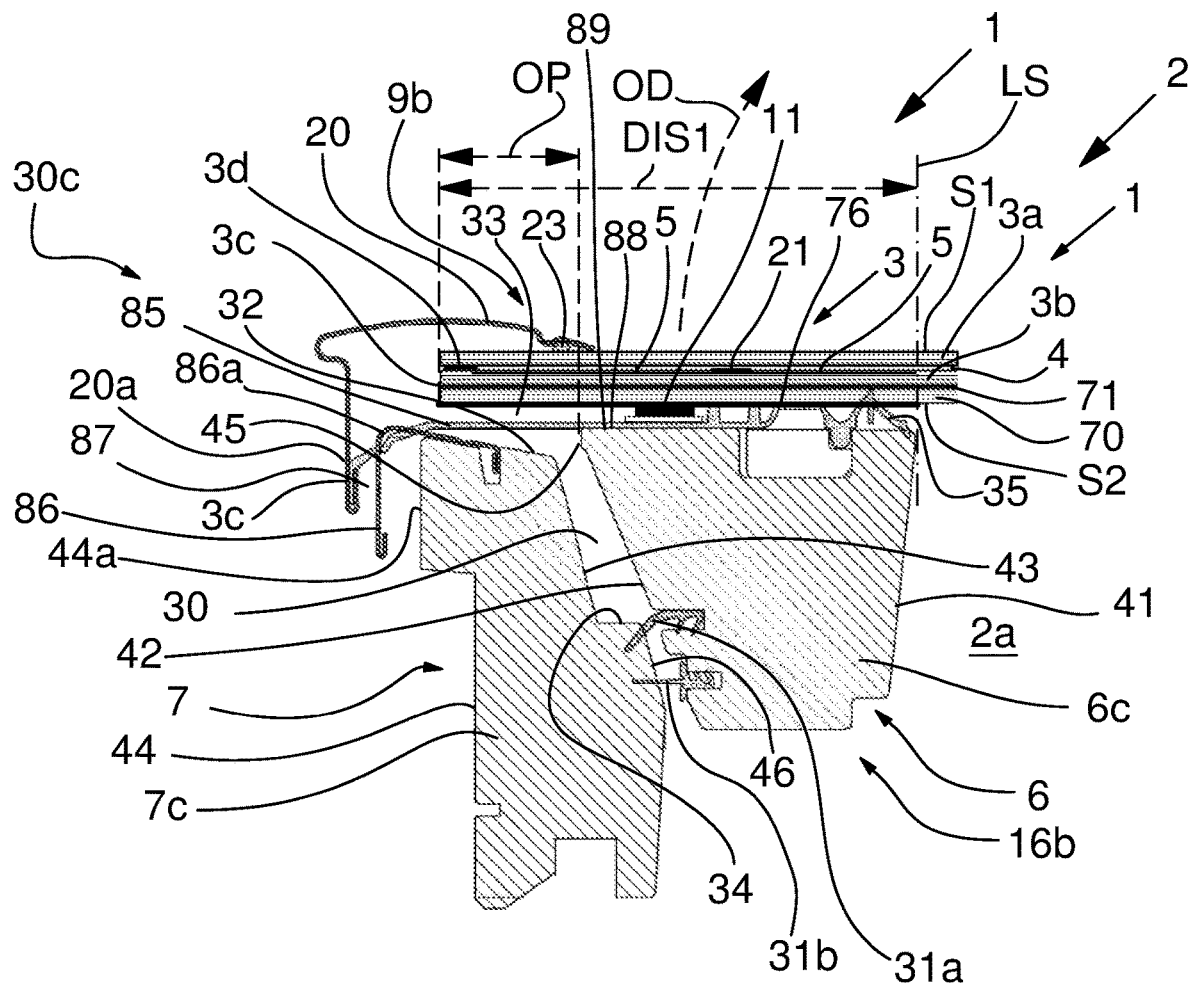
Figure 6:
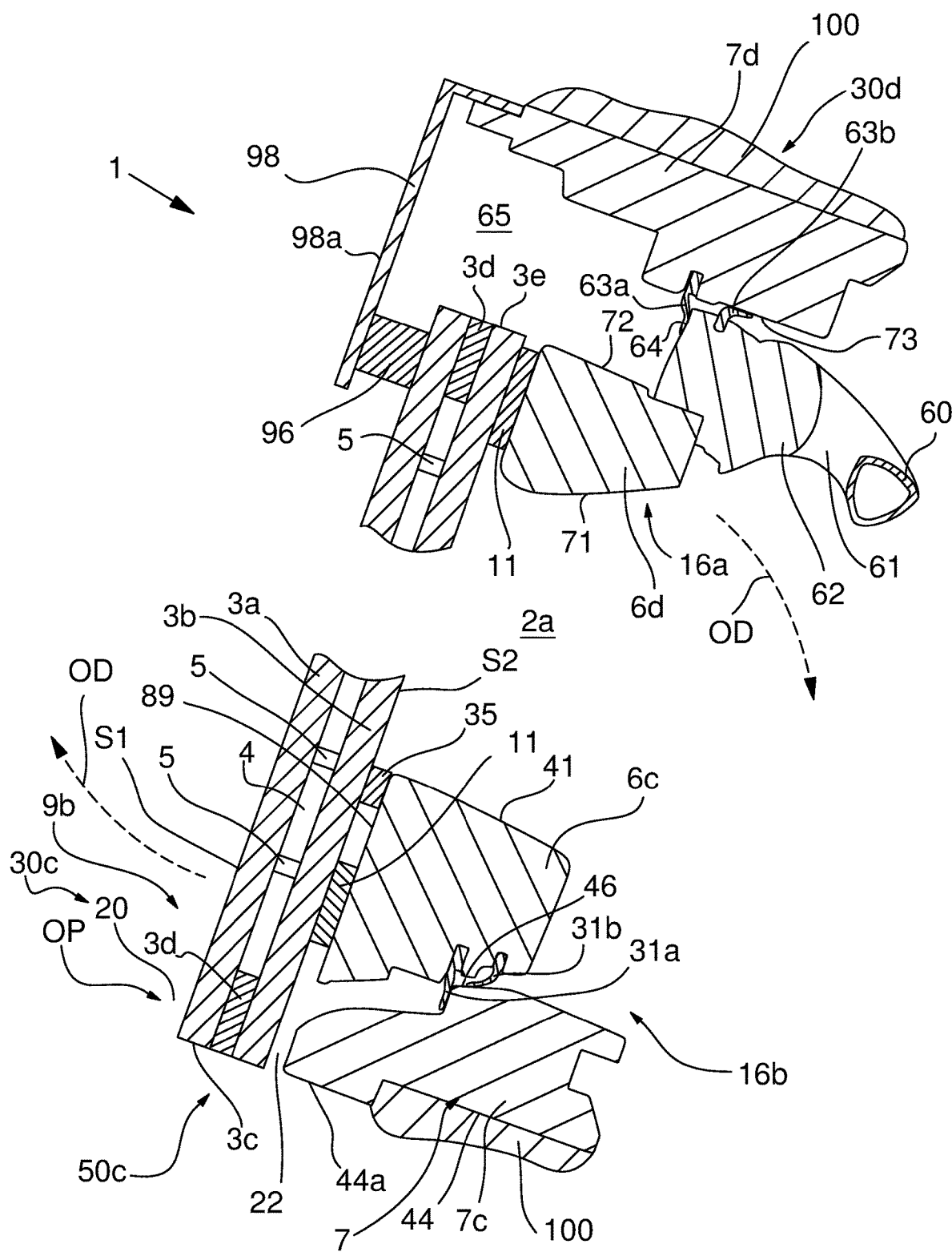
Figure 7:
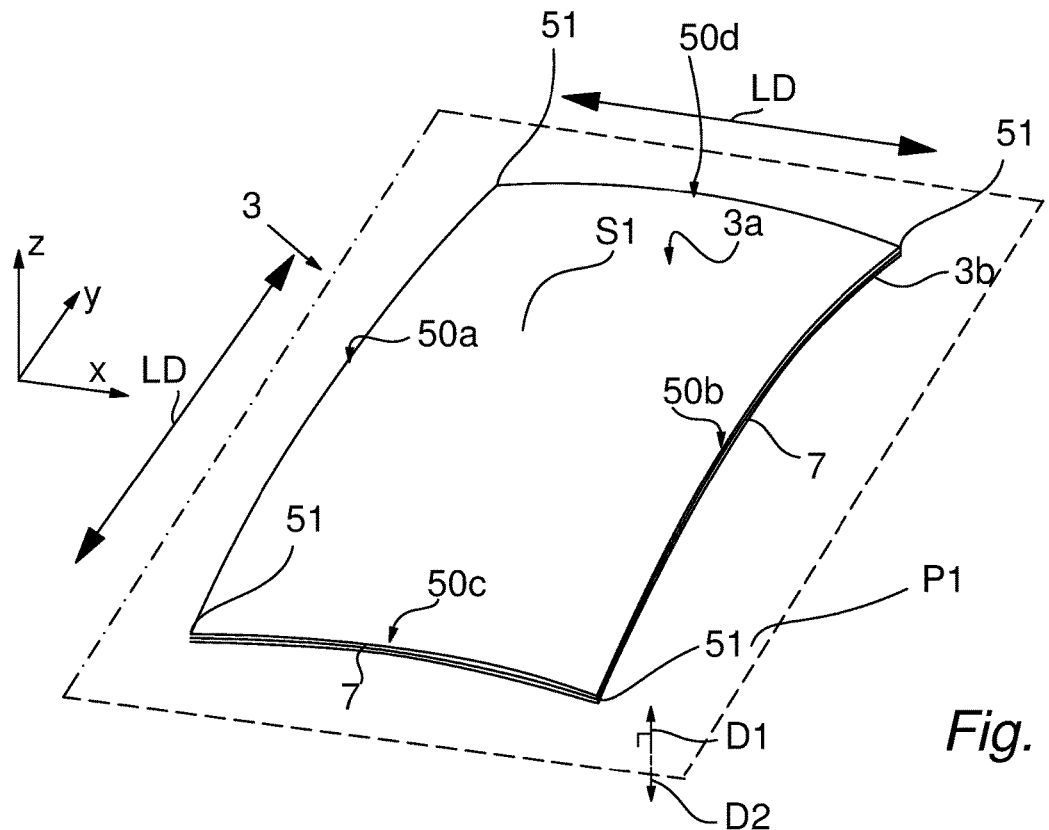
Figure 8:
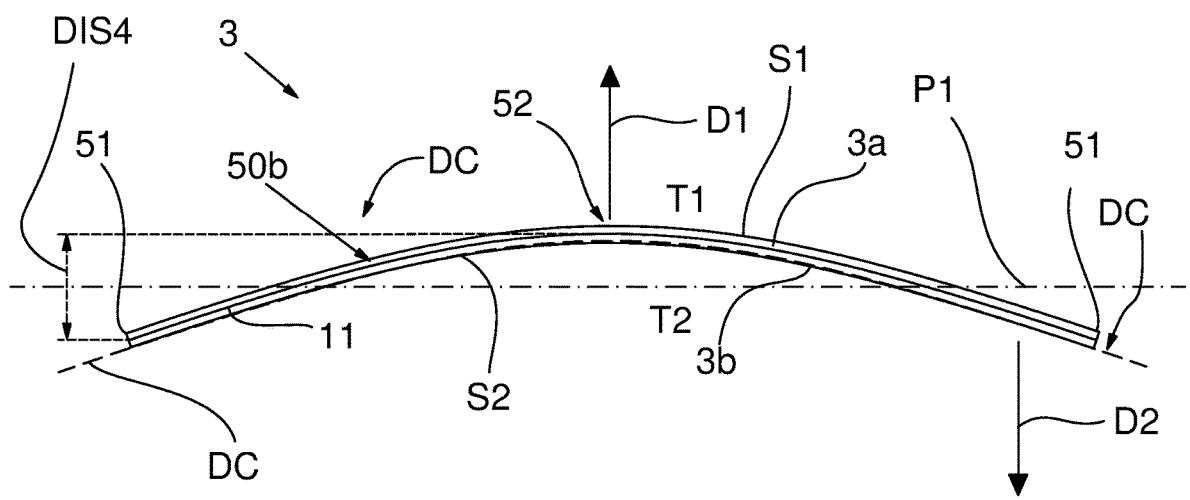
Figure 9:
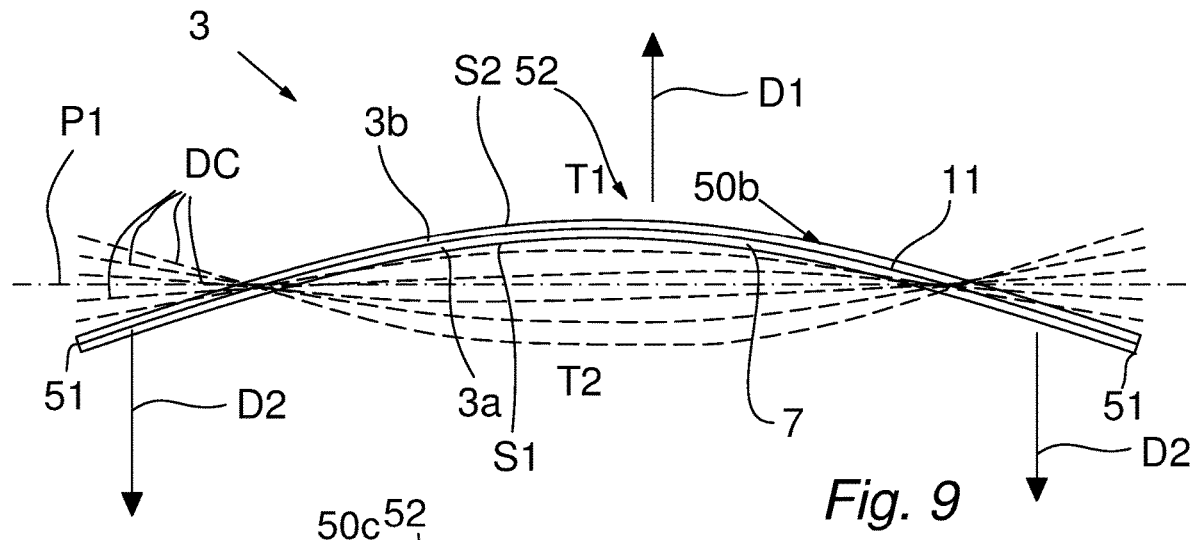
Figure 10:
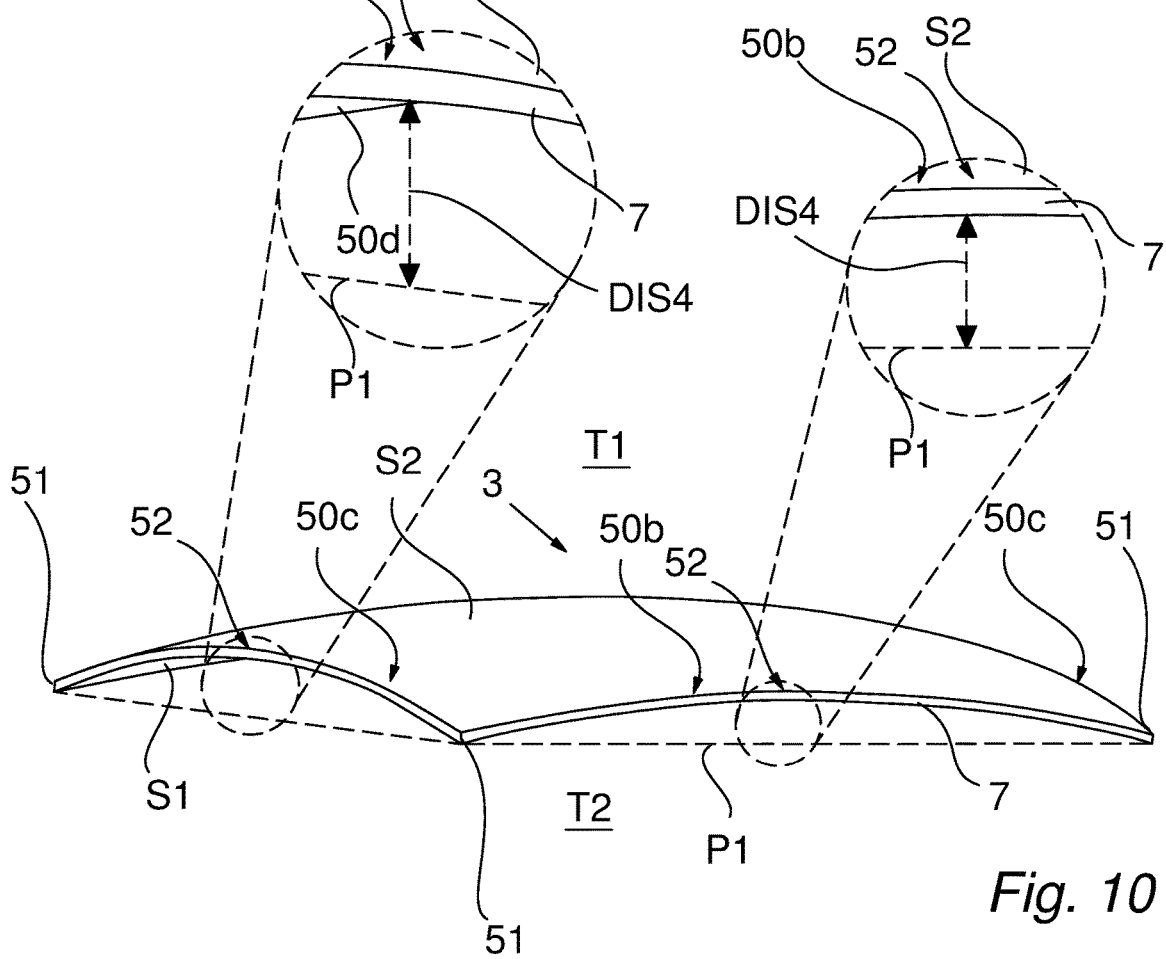
Figure 11:
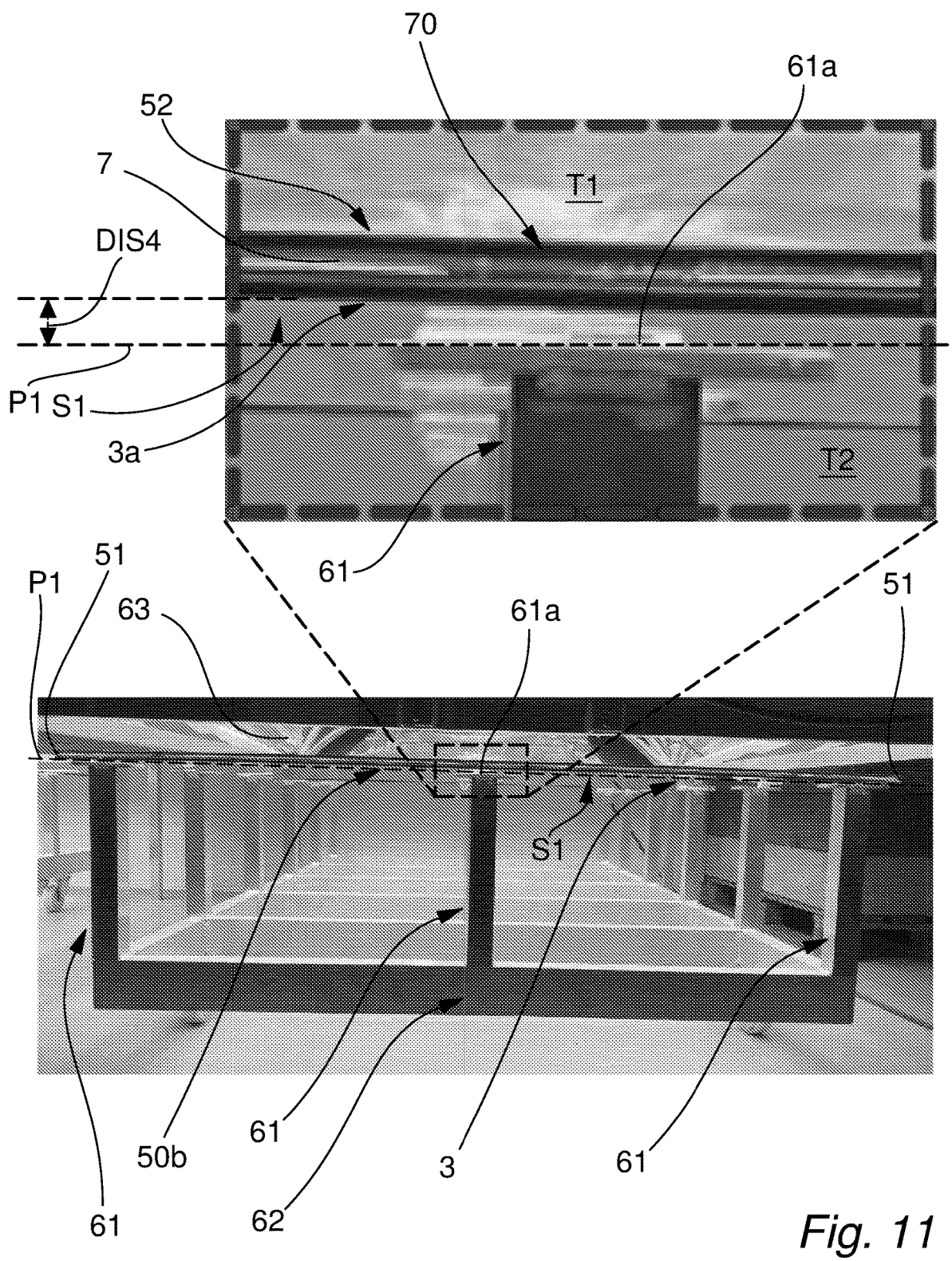
Figure 12:
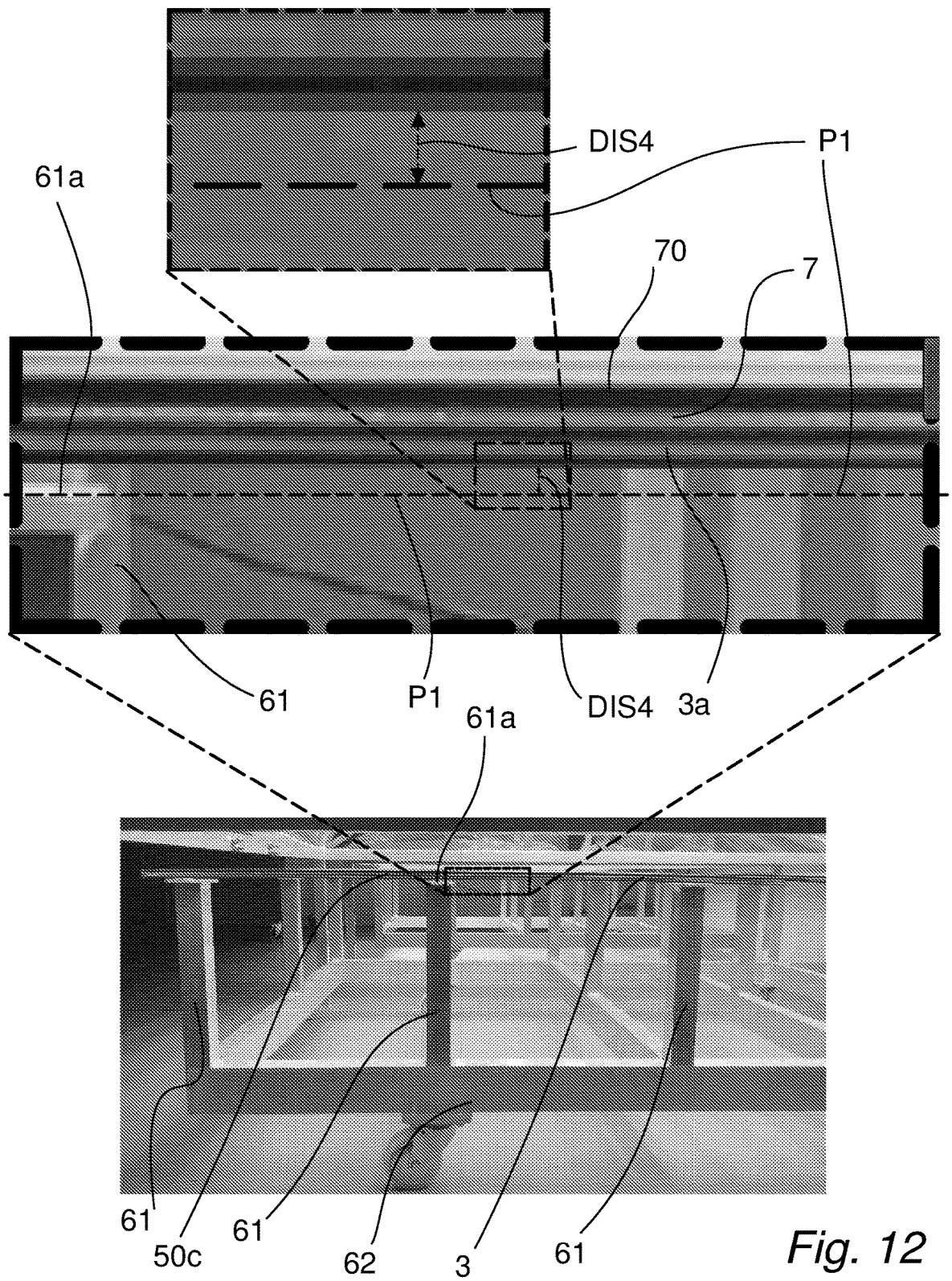

Aspects of the present disclosure will be described in the following with reference to the figures in which:

FIG. 1 illustrates a roof window according to embodiments of the present disclosure, FIG. 2 illustrates a laminated VIG unit according to embodiments of the present disclosure, FIG. 3 illustrates a pivot roof window according to embodiments of the present disclosure, FIG. 4a illustrates a bottom part of a roof window according to embodiments of the present disclosure, FIG. 4b illustrates a top part of a roof window according to embodiments of the present disclosure, FIG. 5 illustrates a roof window according to embodiments of the present disclosure comprising a masking, FIG. 6 illustrates a roof window according to further embodiments of the present disclosure, FIGS. 7-9 Illustrates a VIG unit subjected to thermal deflection, FIG. 10 illustrates a visualization of a thermal deflection of a VIG unit, and FIGS. 11-12 illustrates a test of a thermal deflection of a VIG unit.

DETAILED DESCRIPTION

In relation to the figures described below, where the present disclosure may be described with reference to various embodiments, without limiting the same, it is to be understood that the disclosed embodiments are merely illustrative of the present disclosure that may be embodied in various and alternative forms. The figures are not to scale; some features may be exaggerated or minimized to show details of particular components. Therefore, specific structural and functional details disclosed herein are not to be interpreted as limiting, but merely as a representative basis for e.g. teaching one skilled in the art to variously employ the present disclosure.

FIG. 1 illustrates schematically a pivot roof window 1 with a vacuum insulated glass (VIG) unit 3 according to embodiments of the present disclosure. The VIG unit 3 is fixed in a frame arrangement 2 of the window 1. The frame arrangement 2 comprises elongated frame arrangements 30a-30d, and the VIG unit 3 is arranged to cover a frame opening 2a in the frame. The frame defines a frame opening plane P2, and in FIG. 1, the window is seen from the outside towards the exterior surface S1 of the VIG unit.

The frame arrangements 30a-30d comprises substantially parallel top 30d and bottom 30c frame arrangements and substantially parallel side profile frame arrangements 30a, 30b. In FIG. 1, the VIG unit 3 is arranged in a sash of the frame arrangement 2, which is connected to a fixation frame 7 of the frame arrangement 2 by means of a displacement mechanism such as one or more hinged connections (not illustrated in FIG. 1, see FIG. 8) configured to allow the sash to move relative to the fixation frame 12.

The window 1 comprises elongated water cover members 99a, 99b in the form of upper side cover members 99a and lower side cover members 99b such as plates made from a metal, a plastic material and/or the like. These 99a, 99b covers the side parts 30a, 30b of the fixation frame and the sash. The lower cover members 99b are fixed to the sash or the VIG unit surface S2, whereas the upper cover members 99a are fixed to the frame/fixation fame 7. The top end part 16a of the sash 6 overlaps and is thus covered by an upper horizontal cover plate member 98 providing a top end cladding device that is stationary, and the top end part 16a of the sash 6 opens inwards whereas the lower/bottom part 16b of the sash 6 opens outwards, see FIG. 3. Hence, the upper cover members 99a are stationary too and are fixed to the frame/fixation frame. The cover members 99a, 99b are terminated and thus separated at a centre area 97 of the side arrangements 30a, 30b.

Pivot roof windows have pivot hinges 80 (see FIG. 3) providing an axis of rotation placed between the top and bottom of the window. Often the axis of rotation is substantially about the centre part of the side elongated side frame arrangements 30a, 30b. But sometimes the axis of rotation can for example be raised such as ⅓ of the total window height. The hinge connection is so that a top end part 16a of the sash (6) is configured to move inwards and a bottom end part 16b of the sash is configured to move outwards when opening the sash 6 from a closed position. The advantages however are the same: for example, a pivot roof window allows rotation of the sash so the exterior may be cleaned from the inside. The weather proofing and water drain must be carefully designed for pivoting roof windows.

The dashed line with the reference "LS" at the lower part of the window represents the "line of sight" through the frame opening of the window, and as illustrated the lower part of the VIG unit 3 at the bottom part of the window overlaps a bottom part of the sash 6, this is described in more details below.

An overlapping cover 20, such as a hiding cover plate, is fixed to the vacuum insulated glass unit and/or the sash, and covers and hide a part of the vacuum insulated glass unit 9b which overlaps an elongated bottom frame member 7b of the fixation frame of the roof window 1. Hence, rain water on the surface S1 of the VIG will run down over the outer surface of the overlapping cover plate 20, and away from the window due to gravity when the sash is in a closed position.

As can be seen, the lower cover members 99b may in embodiments of the present disclosure overlap the cover plate so that the plate 20 extends in under the members 99b.

The cover 20 may be omitted in further embodiments, see FIG. 6

The upper horizontal top end cladding device 98 overlaps the upper side cover members 99a, so that these members extends in under the upper horizontal top cover plate member 98. Hence wain water will run from the top end cladding device 98 and down onto the VIG unit surface S1 and the outer surfaces of the upper side cover members 99a.

The VIG unit 3 and the roof window 1 in general is rectangular, so that the elongated side arrangements 30a, 30b are longer than the elongated bottom and top arrangements 30, 30d. The elongated side arrangements 30a, 30b, and the cover members 99a, 99b, 98 extends in their respective longitudinal direction and together provides the rectangular frame opening 2a.

FIG. 2 illustrates schematically a cross sectional view of a VIG unit 3 to be arranged in the frame arrangement 2 according to embodiments of the present disclosure. The VIG unit 3 comprises two glass sheets 3a, 3b such as tempered glass sheets, e.g. thermally tempered glass sheets, but it is understood that one or both glass sheets 3a, 3b may also be float glass sheets such as annealed glass sheets.

The glass sheets 3a, 3b are separated by an evacuated gap 4 located between the glass sheets 3a, 3b, and a plurality of support structures 5 are distributed in the gap 4. The thickness/width of the gap 4 may for example be 0.05-0.5 mm such as between 0.09 mm and 0.25 mm (measured normal to a plane P1 defined by a major surface of one of the VIG unit glass sheets 3a, 3b). The width of the evacuated gap 4 may in embodiments of the present disclosure be 0.5 mm, such as below 0.3 mm, for example about 0.2 mm or 0.1 mm.

The gap 4 is sealed by an edge sealing 3d, such as a fused edge sealing, which may e.g. be made from a solder glass material, e.g. low melting point temperature solder glass material, or a metal solder material.

The support structures 5 may for example be made from metal, such as a steel alloy, glass or a polymer composition and be arranged in a grid or another pattern to maintain the gap 4 between the glass sheets 3a, 3b when the gap 4 is evacuated to a pressure below e.g. $10^{-3}$ bar, such as below $10^{-4}$ bar, e.g. to about or below $10^{-3}$ mbar. The glass sheets 3a, 3b comprises major surfaces S3, S4 facing the gap 4, and the support structures 5 support on these inner major surfaces. The VIG unit also comprises outwardly facing major surfaces S1, S2 facing away from the gap 4. The Uc-value of the vacuum insulted glass unit may be below 0.7, such as below 0.6 or below 0.5.

Especially if the VIG unit glass sheets 3a, 3b are tempered glass sheets, the distance/pitch between neighbouring/adjacent support structures 5 may be above 3 cm or above 4 cm, such as between 3 cm and 6 cm or even more at least some locations in the evacuated VIG unit gap 4.

As described in more details later on, the VIG unit 1 may also be a laminated VIG unit and/or a VIG unit of a hybrid type comprising a further glass sheet providing a further sealed gap between this glass sheet and the VIG unit that may be filled with a gas.

The VIG unit's thickness, measured between the outer, outwardly facing surfaces S1, S2 of the VIG unit, determined in a direction normal to these surfaces, may in embodiments be between 4-15 mm such as between 4-12 mm, e.g. 4-10 mm. This thickness may preferably include an optional lamination glass sheet and lamination interlayer.

The VIG unit 1 defines a VIG unit plane P1 that will extend parallel to or coincide with the frame opening plane P2 (see FIG. 1) when the VIG unit is arranged in the frame arrangement 2. This plane P1 may e.g. be determined when the VIG unit glass sheets 3a, 3b have the substantially same temperature and no substantial thermal deflection of the VIG unit occur, i.e. when a temperature difference ($\Delta T$) between the glass sheets 3a, 3b enclosing the gap is substantially 0 ($\Delta T=0°$ C.).

In FIG. 2, the VIG unit 3 is, in accordance with embodiments of the present disclosure, a laminated VIG unit 3 and accordingly it comprises a lamination glass sheet 70. The lamination glass sheet 70 may be a tempered, e.g. thermally tempered, glass sheet, or alternatively, it may be an annealed glass sheet, or generally a float glass sheet. This lamination glass sheet 70 is attached/bonded (by means of a lamination interlayer 71) to the outer surface of the VIG unit glass sheet 3*b* facing towards the interior of a building when the roof window is installed. Hence, the lamination glass sheet 70 provides the outer interior major surface S1 of the VIG unit 3. The lamination interlayer 71 may be a PVB or EVA lamination material.

FIG. 3 schematically illustrates an embodiment of the present disclosure, wherein the aperture cover is a building aperture cover in the form of a pivot roof window 1 seen in perspective. The roof window is configured to be placed in a roofing structure of a building, such as a building for habitants, an office building or the like. The roof window 1 may in embodiments of the present disclosure be arranged between two roof trusses, but it may also be arranged to another part of the roof structure in further embodiments. The roof window 1 may either be configured to be arranged with an angle between 5° and 85°, such as between 10° and 75°, compared to horizontal, and rain and melting water, dew and the like will thus be guided towards a bottom part/end of the window due to gravity.

The roof window 1 comprises a frame arrangement 2 comprising the movable sash 6 which is connected to the fixation frame 7 of the aperture covering 1 by means of a displacement mechanism 80 such as one or more hinged connections configured to allow the sash 6 to move relative to the fixation frame 7. In the example of FIG. 3, the roof window 1 is a pivot roof window as described above, and thus comprises pivot hinges 80 providing an axis RAX of rotation placed at a location between the top and bottom of the side arrangements 30*a*, 30*b* of the roof window (see FIG. 1). Often the axis RAX of rotation is substantially about the centre portion of the side arrangements 30*a*, 30*b*. The hinge connection 80 is so that a top end part 16*a* of the sash 6 is configured to move inwards and a bottom end part 10*b* of the sash 6 is configured to move outwards when opening the sash 6 from a closed position.

A pivot roof window may generally allow rotation of the sash 6 around the axis RAX so the exterior surface S1 of the VIG unit 3 may be cleaned from the inside.

As can further be seen, the roof window 1 in FIG. 3 may in embodiments of the present disclosure comprise a covering device 75 for covering the window when desired. In the present example the covering 75 is a roller shutter, but it may also be a blind such as a venetian blind, a roller blind or the like in further embodiments. The roller shutter may be electrically operated by means of an electric motor (not illustrated), so as to open or close the roller shutter and controlled by an automation solution and/or by means of a wired or wireless remote control. As can be seen, the roller shutter can be placed at the exterior side of the window. It is however understood that in further embodiments of the present disclosure, the roller shutter and/or other types of covering devices may be omitted from the roof window.

A user, such as a habitant living in a building comprising the window 1 can open and close the window by operating the sash 6, either by hand or by a remote control, such as a wireless remote control that is configured to control an electrically operated actuator device such as a linear actuator such as a spindle or chain drive (not illustrated in FIG. 3). Also or alternatively, a home automation solution may provide an opening and closing of the sash by means of the electrically operated actuator device. This actuator device may be attached to a top or bottom part of the sash, often it is attached/connected to the top part 6*a* in order to open and close the sash.

FIG. 4*a* illustrates a cross section of an elongated structural bottom frame arrangement 30*c* of a building aperture cover In the form of the roof window illustrated in FIG. 1, according to embodiments of the present disclosure, in the cross sectional view A-A illustrated in FIG. 1

The frame arrangement 2 comprises a fixation frame 7 and a sash 6 fixed to the VIG unit 3.

As can be seen, the sash 6 of the roof window 1 comprises the VIG unit 3, which is a laminated VIG unit with the lamination glass facing the interior and providing the interior major surface S2 of the VIG unit 3.

The sash 6 is movably connected to the fixation frame 7 by means of a hinge connection 80 (see FIGS. 1 and 3) so that the bottom end part 16*b* of the sash 6 is configured to move outwards when opening the sash 6 from a closed position.

The bottom end part 16*b* of the sash 6 comprises the elongated, structural bottom member 6*c*. This member 6*c* comprises an inner surface 41 facing towards the top end part 16*a* of the sash (not illustrated in FIG. 4*a*, see FIG. 4*b*), and an opposite exterior surface 42 facing away from the top end part 16*a*.

The vacuum insulated glass unit 3 comprises an overlapping part 9*b* where the evacuated gap 4 overlaps the elongated, structural bottom member 6*c* of the sash 6. This overlapping part 9*b* of the VIG unit 3 moreover overlaps at least a part of the elongated bottom frame member 7*c* of the fixation frame 7.

The elongated bottom member 6*c* of the sash 6 is a structural member of the sash.

The elongated bottom member 6*c* (as well as one or more of the other elongated members 6*a*, 6*b* and 6*d*, see FIG. 1), and/or one or more of the elongated members 7*a*-7*d* of the fixation frame 7 may in embodiments of the present disclosure be made from wood such as a softer wood material such as pine wood, or a harder wood material such as oak, beech or mahogany. The wood may be laminated. Alternatively the elongated members 6*a*-6*d* and/or 7*a*-7*d* may be made from or comprise a polymer material such as a plastic material, for example as PVC or PUR, and/or the members 6*a*-6*d* and/or 7*a*-7*d* may be made from a composite material for example comprising reinforcing carbon fibres and/or glass fibres. In further embodiments, the members 6*a*-6*d* and/or 7*a*-7*d* may be made from or comprise a metal material such as steel or aluminium, for example aluminium shells joined by thermal break members. The members 6*a*-6*d* and/or 7*a*-7*d* may I further embodiments of the present disclosure be made from or comprise fibre reinforced material such as carbon or glass fibre reinforced material that increased the stiffness of the members.

These members 6*a*-6*d* and/or 7*a*-7*d* may either be solid (as illustrated) or hollow and thus comprise insulating cavities that may be filled with air or a desired insulating gas species, or an insulating material such as a polymer based insulation foam, mineral wool and/or the like.

The elongated members 6*a*-6*d* and/or 7*a*-7*d* may in embodiments of the present disclosure (in particular if made hollow) comprise strengthening members (not illustrated) either attached to the elongated members or embedded in one or more of the walls of the elongated members, e.g. by means of a co-extrusion or co-pultrusion process, or by means of a moulding process. These strengthening members may be made from a metal such as steel or aluminium, a polymer material and/or a fibre or fibre reinforced material such as carbon and/or glass-fibre rods or plates.

The interior surface S2 of the VIG unit is attached to the bottom sash member 6*c* (and possibly also to the other elongated sash members 6*a*, 6*b*, 6*d*) by means of a bonding seal 11 such as a structural adhesive. The bonding seal 11 may comprise a structural adhesive such as a silicon adhesive, a silane-terminated polyurethane (SPUR) adhesive or a Modified-Silyl Polymer (SMP) adhesive. As can be seen, the exterior surface S1 opposite to the bonding seal 11 is kept uncovered by the frame.

Gaskets 31a, 31b are provided between the overlapped elongated, structural bottom member 6c of the sash 6 and the elongated bottom frame member 7c of the fixation frame. These gaskets 31a, 31b overlaps the bottom member 6c of the sash and the elongated bottom frame member 7c of the fixation frame 7 and are configured to ensure and provide air tightening between frame 7 and sash 6 and enhances the heat insulation properties of the window 1.

The gaskets 31a, 31b are only fixed to the sash 6. In other embodiments, one or both of the gaskets may be attached to the frame 7 instead. During use of the window, the first gasket 31a will abut and be deflected by the surface 34 of the fixation frame profile 7c. The other gasket 31b will abut a surface 46 of the fixation frame profile 7c that is opposite to that gasket.

As can be seen from FIG. 4a, the vacuum insulated glass unit comprises a part OP extending beyond the outermost edge 45 of the structural bottom member (8c) of the sash 6 which faces away from the top end part 6a of the sash. This part OP moreover overlaps at least a part of a surface 32 the second elongated frame member 7c facing the VIG unit when the sash 6 is in a closed position. A space 33 is provided between the VIG unit surface S2 and the overlapped surface 32 of elongated bottom frame member 7c.

The overlapping part OP may in embodiments of the present disclosure be between 0.5 cm and 15 cm, such as between 1 cm and 10 cm. This distance is measured/determined from the bottom end edge surface 3c of the VIG unit in a direction perpendicular to the longitudinal extent of the edge surface 3c.

The distance DIS1 from the outer bottom edge 3c of the VIG unit 3 and the line of sight LS through the vacuum insulated glass unit may in embodiments of the present disclosure be between 25 mm and 200 mm, such as between 30 mm and 150 mm, such as between 40 mm and 100 mm. This distance DIS1 is determined parallel to an outer major surface S1, S2 of the vacuum insulated glass unit in a direction perpendicular to the longitudinal extent of the lower edge 3c. The line of sight LS is generally defined by an envisaged line (see dashed-dotted line) that is perpendicular to the interior surface S2 of the VIG unit and which provides the outermost border for a view through the VIG unit and frame opening 2a from the interior side of the VIG unit, in this case at the bottom part of the sash.

The gasket 35 illustrated in FIG. 4a may also in further embodiments of the present disclosure provide the line of sight LS at the bottom part of the sash, rather than the bottom sash member's surface. However, the sash member may also alternatively provide the line of sigh LS.

The elongated bottom frame member 7c comprises a surface 43 facing the frame opening 2a defined by the fixation frame 7. An opposite, exterior surface 44 of the member 7c faces away from the frame opening 2a. The surface 43 facing the frame opening 2a is arranged to face and be opposite to the exterior surface 42 of the structural bottom member 8b of the sash 6 when the sash 6 is in a closed position.

The vacuum insulated glass unit 3 may in embodiments of the present disclosure comprise a sealed evacuation opening, and/or a getter 21 arrangement inside the evacuated gap 4, which is/are placed at the part of vacuum insulated glass unit overlapping the structural bottom member 8c of the sash 6.

In other embodiments of the present disclosure, the vacuum insulated glass unit 3 may comprise a sealed evacuation opening and/or a getter 21 inside the evacuated gap which is/are placed at the part OP of vacuum insulated glass unit 3 which extends beyond the outer edge 45 of said structural bottom member 8b of the sash 6 and overlaps at least a part of the elongated bottom frame member 7c. The evacuation opening is not illustrated in FIG. 4c.

The getter 21 may be a non-evaporate getter (NEG) which may comprise a metallic surface, which is responsible for sorption of gas molecules over time in the evacuated gap. The getter can be constituted from materials that readily form stable compounds with active gases. In one or more embodiments, the getter may be a metal-based getter. The metal-based getter may comprise one or more metals selected from group IV elements. In one or more examples, the one or more metals is titanium, aluminium, zirconium, chromium, vanadium, or alloys thereof. In embodiments the getter may be a strip or an elongated getter which extends along at least a part of the VIG edge.

The evacuation opening may be placed in one of the glass sheets 3a, 3b. This opening was used during evacuation of the gap 4 by means of an evacuation cup or in a vacuum chamber. After the evacuation, the evacuation opening has been sealed, either by heating a solder material such as a glass or metal solder material, by employing a cap or disc and/or by sealing an evacuation pipe such as a glass or metal pipe placed in the evacuation opening by means of heat, or alternatively or additionally by means of a mechanical compression of the pipe. By placing the getter and/or the evacuation opening in the part 9b and/or OP of the VIG unit, this/these are not visible from the inside of the building. Additionally the evacuation opening may be better protected at such location because it may be a fragile component of the VIG.

A masking as explained further below may in further embodiments help to hide the getter and/or evacuation opening so that this/these are not visible, or only partly visible from the outside.

An overlapping cover 20, in the form of a hiding cover plate, is fixed to the vacuum insulated glass unit surface S1, and is arranged to cover and hide the part of the vacuum insulated glass unit 9b which overlaps the elongated bottom frame member 7b. However, the area of the overlapping part 9b of the VIG unit that is opposite to the bottom sash member 6c is exposed and uncovered by the cover plate 20.

The cover plate 20 provides a cladding wall 20a extending over the bottom end surface 3c of the VIG unit and further towards the surface a part 44a of the exterior surface 44 of the bottom frame member 7c that faces away from the frame opening. This is the case when the sash 6 is in a closed position. In FIG. 4a, the cladding wall, also called a water skirt, or just "skirt" is an integrated part of the cover plate 20, and is provided by bending the plate so that it extends in over the surface 1 of the VIG unit and in over the surface 44a of the bottom part of the frame 7.

In other embodiments of the present disclosure (not illustrated), the cladding part 20a may be provided by attaching a wall member to the cover 20 arranged to extend in over the surface S1.

The cladding feature 20a helps to enable a good water tightening and rain water draining from the surface S1 when the window is installed.

The overlapping cover 20 is fixed to the exterior surface S1 of the vacuum insulated glass unit, by means of an adhesive 23 such as a silicon adhesive, a silane-terminated polyurethane (SPUR) adhesive or a Modified-Silyl Polymer (SMP) adhesive. The adhesive 23 may be a strip of adhesive material extending in the longitudinal direction of the cover parallel to the bottom edge surface of the VIG unit to provide improved water tightness. A resilient gasket strip (not illustrated) such as a rubber or elastomer gasket may also or alternatively be added, e.g. in case that the adhesive 23 may comprise discretely arranged adhesive parts, or generally in order to further improve water tightness between the overlapping cover and the VIG unit.

A gasket arrangement 35 is placed in a space between the VIG unit surface S2 and a surface 89 of the overlapped bottom sash member 3c of the sash 6. This gasket helps to provide air tightness ad may also be deflected by the VIG unit in case the VIG unit thermally deflects in response to a temperature difference between the two glass sheets 3a, 3b of the VIG unit.

It is generally understood that the gaskets 35, 31a, 31b are resilient and may be made from rubber such as a natural or synthetic rubber, and/or from a resilient foam gasket material and/or suitable elastomers.

When the window is opened, the bottom end part 16b of the sash moves away from the fixation frame member 7c in the opening direction indicated by the arrow OD, and hence moves outwards away from the frame opening 2a and the interior part of the building in which the window is installed, see also FIG. 3.

The bottom part of the sash comprises a resilient gasket part 85 such as a rubber gasket part, that is configured to extend out over a corner surface 86a of a further cladding device 86. Hence, during use, when the sash 6 is in a closed position, the gasket part 85 is stretched and abuts the corner surface 86a. The gasket part 85 is fixed (by clamping, adhesion and/or other fastening means) to the cladding wall 20a extending over the bottom end surface 3c of the VIG unit 3 and over the outer surface 44a. Perforations (not illustrated) may be provided in the gasket part 85 so that condensation water on the interior VIG unit surface S2 at the overlapping part OP can thus drop down onto the gasket part surface 85 and be guided by gravity to the perforations in the gasket part 85 and leave the bottom part of the window through an opening/space 87 between the gasket support device 86 and the cladding part 20a.

As can be seen the gasket part 85 may in embodiments of the present disclosure be part of a common gasket sheet 88 that comprises both the gasket part 85 and provides the gasket 35 between the interior VIG unit surface S2 and the bottom sash member 6c proximate the line of sight LS and the outer surface 41 of the sash member 6c. A part of the gasket sheet 88 may thus be attached to and/or abut a surface The gasket support device 86 is a plate such as a metal, plastic or fibre reinforced, bended plate that is fixed to the sash profile 7c at/in the surface 32 and extending from here to the bended portion 86a and from here down over the outer surface 44a between the cladding wall 20a and the outer surface 44a. The gasket part 85 may also help to provide a protection against drifting snow and moist entering onto the bottom frame construction.

FIG. 4b illustrates a cross section of an elongated structural top frame arrangement 30d of a building aperture cover illustrated in FIG. 1, according to embodiments of the present disclosure, in the cross sectional view B-B illustrated in FIG. 1

The top end part of the window comprises the elongated top sash member 6d. This member 6d is in FIG. 4b attached to the interior surface S2 of the VIG unit 3 by means of an adhesive 11 such as a structural adhesive such as a resilient structural adhesive.

In other embodiments of the present disclosure (not illustrated), the elongated side members and/or the top member 6d of the sash 6 may be attached to the VIG unit by means of a clamping arrangement that provides oppositely directed clamping forces towards the outer major surfaces S1, S2 of the VIG unit along the side edge surfaces and/or the top edge surface 3e of the VIG unit, in order to fixate the VIG unit in the sash 6 and possibly also in order to ensure a water tight connection between sash 6 and VIG unit 3. However, as the VIG unit's bottom edge surface (and preferably also the evacuated gap) may extends beyond the outermost edge 45 of the sash, the VIG unit may in preferred embodiments of the present disclosure be attached to the VIG unit by means of a structural adhesive 11 as for example illustrated in FIG. 4a.

The bonding seal 11 illustrated in FIGS. 4 and 4b may in embodiments of the present disclosure have a thickness above 4 mm such as above 5 mm, for example above 6 mm. The bonding seal 11 may in embodiments of the present disclosure have a thickness between 4 mm and 13 mm, such as between 5 mm and 10 mm, for example between 6 mm and 10 mm, at a temperature difference between the two glass sheets 3a, 3b of the VIG unit of 0° C. The thickness of the bonding seal 11 material is measured in a direction substantially perpendicular to the major surface S2 between the surface S2 and the surface to which it is attached. The adhesive material 11 may in embodiments of the present disclosure be partly (further) compressed and/or partly stretched or less compressed along the longitudinal extent of the adhesive 11 by the VIG unit 3 in response to a thermal deflection of the VIG unit caused by a temperature difference between the glass sheets 3a, 3b that encloses the evacuated gap 4. The largest compression of the bonding seal along the bonding seal, due to the thermal deflection of the VIG unit may in embodiments be at least 1 mm such as at least 2 mm or at least 3 mm at a position/area along the bonding seal 11 at a temperature difference ΔT between the glass sheets 3a, 3b enclosing the evacuated gap of 40° C. or 65° C.

A gasket 81 is placed between the VIG unit 3 and the top sash member 6d, and here, the gasket 81 defines the line of sight LS through the VIG.

The frame arrangement 2 comprises a top cladding device 98 configured to extend from the fixation frame 7 and over the top end part 16a of the sash 6, at least when the sash is in a closed position. The top cladding device 98 is attached to the fixation frame 7, in the present example by attaching it to the elongated top frame member 7d. This is provided by connecting the cladding device 98 to the frame 7 through an elongated connection part 97. The cladding device is connected to the connection part 97 by means of mechanical fasteners (not illustrated) such as nails, pop rivets, screws and/or the like, and/or these may be connected by means of a chemical fastening means such as a glue. The connection part 97 is fixed to the elongated frame member 7d by means of fasteners such as screws, nails, pop rivets and/or a glue. The connection part 97 may provide structural strength to the connection part and/or help providing a distancing of the cladding wall part 98a of the cladding device 98 that extends in over and thus overlaps the exterior part of the VIG unit 3 and sash 6.

A resilient gasket 96 such a rubber gasket is connected to and held by the cladding device 98, and hence, when the sash is in a closed position as illustrated in FIG. 4b, the gasket 96 is compressed/deflected by the sash or the VIG unit surface S1. In the present example, the gasket 96 abuts directly to the VIG surface S1, but in other embodiments (not illustrated), it may be a part of/attached to a part of the sash 6 placed opposite to the exterior surface S1 dependent on the sash solution (such as a clamping and/or adhering solution arranged at the outer surface S1) implemented at the top end part 16*a* of the sash.

In the present example of FIG. 4*b*, the gasket 96 is connected to the cladding device 98 through an elongated interconnection part 95 and a gasket connection profile 94 that is fixed to the elongated interconnection part 95. An optional air filter or air duct (not illustrated) may also be present to allow ventilation. Adhesives and/or mechanical fastening solutions such as nails, screws, pop rivets and/or interconnecting recesses and protrusions (see connection between gasket 96 and gasket connection profile 94) may provide the connection between the parts 96, 94, 95.

The resilient gasket 96 may e.g. help to provide air tightness and/or water tightness of the window 1. The gasket 96 may in embodiments of the resent disclosure be configured to be compressed by at least 2 mm such as at least 4 mm or at least 6 mm when the sash is closed (and no temperature differences ΔT between the VIG unit glass sheets 3*a*, 3*b* is present). This may help to assure tightness under more extreme conditions in case the VIG unit thermally deflects and allows the gasket to expand or be further compressed in response to the thermal deflection of the VIG unit near the edge of the VIG unit.

The cladding device 98 may in embodiments of the present disclosure comprise a member such as a plate (as illustrated) made from metal sheet/plate, it may be a polymer plate/sheet such as a plastic, e.g. a PVC or PUR plate, or it may be a fibre reinforced plate/sheet such as a cladding device comprising carbon fibres and/or glass fibres.

When rain water hits/reaches the exterior surface 98*s* of the cladding device, the water will run and be guided over the surface 98*s* by gravity and down on the exterior surface of the VIG unit S1.

When the window/sash 3 is opened, the top end part 16*a* of the sash 6 moves away from the cladding device 98 in the opening direction indicated by the arrow OD, and hence moves inwards into the building.

The top end part 16*a* of the sash 6 may as illustrated in FIG. 4*b*, in embodiments of the present disclosure, comprise a handle arrangement 60. The handle arrangement 60 comprises a handle 61 in the form of a rod connected to a handle profile arrangement 62 through handle connectors 61 (only one handle connector is visible in FIG. 4*b*)

The handle arrangement profile 62 is attached to the elongated top sash member 6*d*. When the sash is in a closed position as illustrated in FIG. 4*b*, the handle profile 62 is placed partly between the elongated top sash member 6*d* and the elongated top member 87*d* of the fixation frame 7.

Gaskets 63*a*, 63*b* are provided. A first gasket 63*a* is fixed to the fixation frame top member 7*d* and configured to be deflected by the and abut the surface 64 of the handle profile arrangement 62 during use when the sash is in a closed position. The other gasket 63*b* is fixed to the handle profile arrangement 62 and during use, it will deflect and hence abut the interior surface 73 of the top frame member 7*d* that faces the frame opening 2*a*.

It is understood that in some embodiments of the present disclosure (not illustrated), the handle profile arrangement 62 may be omitted or placed at another location, and the sash top member 6*d* may thus be placed closer to the frame member 7*d*, e.g. so that the gaskets 63*a*, 63*b* are placed between these instead.

The handle arrangement profile 62 may in embodiments of the present disclosure comprise two elongated profiles which are configured to move relative to each other in order to control a locking mechanism (not illustrated) that locks the sash 6 in the closed position so as to interlock with a part of the frame 7, such as a latch-notch configuration.

It is generally understood that in FIG. 4*b*, the gaskets 63*a*, 63*b*, 31*a*, 31*b* and gasket parts 35 and 85 are all schematically illustrated in FIGS. 4*a*-4*b* as un-deflected and hence seems to extend through/into parts 7*c* (for gaskets 31*a* and 31*b*), 7*d* (for gasket 63*b*), 62 (for gasket 63*a*), 86 (for gasket part 85) of the frame arrangement and lamination glass 70 (for gasket part 35) of the VIG unit. In practice however, these gaskets will be compressed/deflected by these parts of the frame or the VIG unit in order to provide water and/or air tightening, see also FIG. 6.

An air space 65 is formed in the top frame arrangement 30*d* and is enclosed by the top cladding device 98, the fixation frame top member 7*d* and the sash top profile 6*d*. Also, in this example the gaskets 96, 63*a*, the (optional) handle profile arrangement 62, and in also the VIG unit end surface 3*e* and the elongated interconnection part 95 and gasket connection profile 94 encloses the air space 65 due to the frame construction, but is understood that some of these parts may be omitted in other embodiments.

The VIG unit top edge surface 3*e* is in FIG. 4*a* terminated so that it does not extend out over the outermost part of the surface 72 of the sash top member 72. However in further embodiments of the present disclosure (not illustrated), the top end edge surface 3*e* of the VIG unit 3 may extend out over/beyond the outermost surface part of the outer surface 72 of the top sash profile 6*d*, and hence extend into the space 65 (e.g. together with a part of the evacuated gap) in the elongated top arrangement 30*d* of the frame arrangement 2. This may help to provide a window having an even more improved heat insulation property as the cold bridge provided by the edge seal 3*d* is placed further away from the line of sight LS.

A minimum distance between an outer major surface(s) S1, S2 of the VIG unit and the surface of the member 6*d* and/or 6*c* (see FIGS. 4*a*, 4*b*) facing the VIG unit may in embodiments of the present disclosure be at least 4 mm such at least 5 mm, for example at least 6 mm at a temperature difference ΔT=T1−T2 between the two glass sheets 3*a*, 3*b* of the vacuum insulated glass unit of substantially 0° C.

FIG. 5 illustrates a bottom part of the roof window according to embodiments of the present disclosure substantially similar to FIG. 4*a*. Here, a masking 76 is provided to mask a part of the lower part of the vacuum insulated glass unit which overlaps the structural bottom member 6*c*. The masking 76 extends in FIG. 5 to the part OP that overlaps the elongated bottom frame member 7*c*, and which is covered by the overlapping cover 20. But the masking 76 may also in other embodiments be terminated somewhere here as the covering part 20 provides a hiding of the reaming part of the frame. If the covering part 20 is omitted, the masking may preferably extend all the way to the edge 3*c*, or at least over the entire part that is visible from the outside and covers the frame 2.

The masking 76 may be a sheet, plate or coating, such as a ceramic coating, which is bonded to a major surface S1, S2 of the VIG unit. The masking may also be placed at the lamination glass 70 surface that for example that faces the lamination interlayer 71. The masking 76 reduces or prevents a look through the VIG unit at the location of the masking 76, but may give the impression of a larger and "uninterrupted" glass outer surface S1, and hence provide desired aesthetic appearance of the building aperture cover 1.

FIG. 6 illustrates a side cross section of a roof window according to embodiments of the present disclosure, wherein the pivot roof window is attached to a roof construction 100 in accordance with embodiments of the present disclosure. The roof window 1 is arranged so that the VIG unit surfaces S1, S2 inclines and are thus not vertically arranged, and the surfaces 98a, and S1 ensures that rain water, snow and the like will run off the window due to gravity and not get into the construction of the frame arrangement 2 when the sash is in a closed position as illustrated. Additionally, condensation water at the interior surface S2 of the VIG unit at the overlapping part OP leaves the bottom part of the window and out onto an outer roof construction (not illustrated).

As can be seen, the cladding wall 20 may be omitted in embodiments of the present disclosure, so that surface S1 at the bottom part of the window, e.g. between the elongated water cover members 99a, 99b (see FIG. 1), may be substantially fully exposed and visible. Though, in embodiments, a narrow screening wall/protection device (not illustrated) may cover the outer edge 3c of the VIG unit.

Also, in embodiments, the further cladding device 86 attached to the fixation frame may be provided (not illustrated in FIG. 6) even though cladding device 20 is omitted.

As described in more details further below. The bottom edge 50c of the VIG unit may describe an edge deflection curve due to thermal deflection of the VIG unit.

Hence, in embodiments of the present disclosure, a space 22 may be provided as between the overlapped elongated bottom frame member 7c and vacuum insulated glass unit 3. Hence bottom edge 50c of the vacuum insulated glass unit 3 is allowed to provide a deflection curve/arc DC between the corners where the bottom edge 50c terminates in response to a temperature difference ($\Delta T=T1-T2$) between the two glass sheets 3a, 3b of the vacuum insulated glass unit. Hereby, the vacuum insulated glass unit opposite to the space 22 can thereby be allowed to move into and/or away from the space 22. This may preferably be provided so that neither the centre part of the edge, nor the corner parts of the edge will touch the bottom frame part, at least as long that the temperature difference $\Delta T$ is less than 65° C.

FIGS. 7 and 8 illustrates schematically a VIG unit's 3 thermal deflection of the VIG unit's edge as a result of a temperature difference $\Delta T=T1-T2$ between the two VIG unit glass sheets 3a, 3b providing the evacuated gap 4, according to embodiments of the present disclosure.

In FIG. 7, the VIG unit 3 is shown schematically and in perspective, where it can be seen that the outer major surface S1 of the VIG unit 3 obtains a convex shape when a first temperature T1 (See FIG. 8) is higher than temperature T2 at the other side of the VIG unit, whereas the outer surface S2 of the other (lower) glass sheet 3b (not visible in FIG. 10) provides a concave shape due to the thermal deflection and the reduced pressure in the evacuated gap.

The VIG unit 1 deflects relative to the VIG unit plane P1 (determined where $\Delta T$ is substantially zero) and relative to the frame opening (not illustrated in FIGS. 12-13), in the directions D1, D2 which are perpendicular to the plane P1. The plane P1 extends in the x-y direction/plane. As can be seen the VIG unit edges 50a-50d provides a deflection curve (DC—See FIG. 8) causing the VIG unit edge centre 52 to move in the directions D1, D2 which are in the z direction, relative to the plane P1. This deflection curve DC is described between the corners 51 where the respective edge 50a-50d terminates.

The VIG unit 3 is rectangular and comprises longer, parallel edges 50a, 50b, and shorter end edges 50c, 50d.

FIG. 8 illustrates schematically and seen from the side onto the long edge 50b, the thermal deflection of the edge 50b. As can be seen, the VIG unit edge 50b tends to describe a deflection curve DC due to thermal deflection of edge 50b, caused by a temperature difference $\Delta T=T1-T2$ between the two glass sheets 3a, 3b. In the present example, the glass sheet 3a is subjected to a higher temperature T1 than the glass sheet 3b which is subjected to temperature T2. This causes the glass sheet 3a to expand more than glass sheet 3b. As the edge seal 11 of the VIG unit 3 may provide a very rigid connection between the glass sheets, this causes the VIG unit 3 to thermally deflect, so that the edges of the glass sheets 3a, 3b moves in the same direction, and this temperature difference causes the edge 50b to describe a deflection curve DC that varies relative to the plane P1.

The outer, major surface S1 of the VIG unit 3 at and near the edge 50b, e.g. at the surface S1 opposite to the edge seal 3 thus obtains a convex shape when T1 is higher than T2 whereas the outer surface S2 of the other (lower) glass sheet 3b provides a concave shape.

As can be seen, the corners 51 of the VIG unit where the edge 8b terminates moves in a direction D2 relative to the plane P1, whereas the centre portion 52 of the edge 50b, moves in the opposite direction D1 than the direction D2, relative to the plane P1. This is the case when the VIG unit is not fixed in a frame and is allowed to freely bend in space in the z-direction.

When/if the glass sheet 3b gets hotter than glass sheet 3a, caused by a temperature change of T1 and/or T2, the corners 51 of the VIG unit moves in the other direction D1 relative to the plane P1 and/or P2, and the centre portion 52 of the edge 50b, move in the direction D2, relative to the plane P1.

In one or more other embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the VIG unit at a temperature difference $\Delta T=T1-T2$ of 0° C. is at least 2 mm, such as at least 3 mm or at least 4 mm, such as in the range of 2 mm to 30 mm, preferably in the range of 3 mm to 20 mm. This is in an un-constricted state where the VIG unit is allowed to freely bend. These numbers with regarding to DIS4 may also apply for a laminated VIG unit in embodiments of the present disclosure. The numbers with regard to DIS4 may apply for a VIG unit having a surface area of the surfaces of above 0.9 m$^2$, such as at least 1.1 m$^2$, such as above 1.5 m$^2$. Here, it may be preferred that at least the longer edges 50a, 50b may be above 1 m in length.

In some embodiments, the total edge deflection DIS4 will be the sum of the largest distances of positions of the VIG unit edge in question from the plane P1 in each their direction D1, D2 from that plane. In FIG. 13, the largest total edge deflection DIS4 is defined between the deflection of the edge seal 11 at the centre 52 of the edge 50b, and the edge seal 11 at the corner 51 of the same edge, in a direction perpendicular to the plane P1.

In one or more embodiments of the present disclosure, the largest total edge deflection DIS4 of any of the edges 50a-50d of the vacuum insulated glass unit 3 at a temperature difference $\Delta T=T1-T2$ between the two glass sheets 3a, 3b of 65° C. as compared to the vacuum insulated glass unit at a temperature difference $\Delta T$ of 0° C. is at least 0.3% of the length of the deflecting edge, such as in the range of 0.3% to 3.5% of the length of the deflecting edge, such as in the range of 0.4% to 2% of the length of the deflecting edge, such as in the range of 0.6% to 1.5% of the length of the deflecting edge. In one or more further or alternative embodiments of the present disclosure, the largest total edge deflection DIS4 of any of the edges 50a-50d of the vacuum insulated glass unit at a temperature difference between the two glass sheets of 40° C. as compared to the vacuum insulated glass unit at a temperature difference of 0° C. may be at least 0.15% of the length of the deflecting edge, such as in the range of 0.15% to 3% of the length of the deflecting edge, such as in the range of 0.25% to 1.8% of the length of the deflecting edge, such as in the range of 0.35% to 1.2% of the length of the deflecting edge.

FIG. 9 illustrates an example of a situation where a VIG unit 3 is subjected to a varying temperature difference ΔT=T1−T2 between the glass sheets 3a, 3b over time, according to embodiments of the present disclosure. For example, it is common for e.g. building aperture covers such as windows or doors arranged in openings of outer walls, roofs or the like of a building, that these are subjected to varying temperature differences over time after they have been installed. For example, with a general room temperature T1 of e.g. about 20° C. in the building, the temperature T2 at the other side (outside a building) of the VIG unit 3 may vary significantly, such as between e.g. 15° C. and 30° C. or even more, over 24 hours. Even, the temperature difference ΔT=T1−T2 may so to say switch "operational sign" so that the hotter side of the VIG unit 3 may shift one or more times over e.g. 24 hours, many times over a calendar year, or even in the case that a hail, rain or snow shower occurs for a short period of time. This may largely depend on the geographical area where the VIG unit frame assembly is installed, and causes the rate and even direction of the thermal deflection to change over time.

As an example over 24 hours, the outside temperature T2 may start to be 10° C. at 8 PM, and at 3 AM it may be 35° C., and it then gradually decreases again to 10° C. overnight. The inside temperature T1 is set to e.g. be 20° C. the whole 24 hours. This causes the temperature difference ΔT to switch operational sign: The temperature T1 is 20° C. at the inside, and T2 (outside) is 10° C. at 8 PM. Thus, the VIG unit edge 50b corners 51 deflect in the direction D2 as illustrated in FIG. 13. Then the thermal deflection of the VIG unit edge 50b gradually changes (illustrated by dashed, envisaged deflection curves/arc DC) as the temperature T2 changes to be 35° C. at 3 AM at surface 4b, and thus 15° C. higher than T1. Thus, the VIG unit thermal deflection changes so that the edges 5a0-50d deflects in the other direction, and then, it deflects back again as the temperature T2 changes back to the about 10° C. overnight. This may even vary over the year dependent on the time of year, and e.g. in winter time, the outside temperature may be significantly below 0° C., and in the summer time, it may be significantly above 30° C., although the inside room temperature may be desired to be substantially constant, e.g. by help from a room heating system or cooling system (e.g. air-conditioning). These systems may also be known as HVAC (Heating, ventilation, and/or air conditioning). Even more extreme temperature conditions may appear in cases where the VIG unit is installed in a roof window.

Accordingly, the thermal deflection of the VIG unit 3 may vary significantly over 24 hours and even more over a longer period such as a calendar year and may depend on different weather conditions. This causes varying stress condition on the VIG unit over time, such as at the edges 50a-50d near the location where the VIG unit glass sheets are connected to seal the evacuated gap by e.g. an edge sealing which seals the evacuated gap. The stress conditions are complex. Examples of these stresses may be shear stresses at the VIG edge, differential stresses where tensile stress occurs at the deflecting glasses and/or stress concentrations at the corners.

The frame may in embodiments of the present disclosure comprise a restriction arrangement for restricting the thermal deflection of the edge(s) 8a-8d, such as for example the longest edges 50a, 50b of the VIG unit or all edges of the VIG unit. This restriction arrangement may comprise a gasket solution, one or more stop parts or walls of the frame preventing an edge deflection above a certain point and/or the like, or a clamping solution as described in relation to FIG. 11. Additionally, it is understood that a bonding seal 11 at one side of the VIG unit may provide a restriction of the thermal edge deflection in embodiments of the present disclosure.

In one or more embodiments the largest edge deflection DIS4 (see FIG. 12) in a deflection direction of any of the edges of the vacuum insulated glass unit at a temperature difference between the two glass sheets of 65° C., as compared to the vacuum insulated glass unit at a temperature difference (ΔT) of 0° C. may be at least 1 mm, such as in the range of 2 mm to 50 mm, preferably in the range of 1, 2 or 3 mm to 15 mm, more preferred in the range of 2 to 10 mm. This may change the thickness of the bonding seal 11 at one or more locations along the member 13a when compared to the thickness at the same one or more locations when the temperature difference ΔT is substantially 0° C.

The sash 6 may be configured to partly restrict a thermal deflection of the vacuum insulated glass unit 3 at the edges 50a-50d in response to a temperature difference ΔT between the glass sheets 3a, 3b of the vacuum insulated glass unit, when compared to a free, unrestricted thermal deflection of the vacuum insulated glass unit at substantially the same temperature difference ΔT. For example, in one or more aspects of the present disclosure, the largest total edge deflection of the edges 50a-50d of the VIG unit 3 may be configured to be at least 10% smaller, such as at least 20% smaller, such as at least 30% smaller than the largest total edge deflection of the unrestricted vacuum insulated glass (VIG) unit at a temperature difference (ΔT=T1−T2) of at least 40° C., such as about 65° C.

FIG. 10 illustrates a visualized computer simulation of a "free" thermal deflection of a VIG unit 3 used for a frame 2 according to embodiments of the present disclosure, which has been provided by one of the present inventors. The VIG unit 3 simulated was based on a VIG unit model defined to have the following characteristics:

The VIG unit is laminated and hence comprises a lamination glass and a lamination interlayer
Length L1 of shorter edges 50c 50d: 114 cm
Length of the longer edges 50a, 50b: 140 cm
Glass sheets 3a, 3b: Thermally tempered glass sheets each having a thickness of 4 mm.
Lamination glass: annealed float glass of a thickness of 4 mm
Edge seal 11 material: solder glass edge seal material
The VIG is arranged with the surfaces S1, S2 horizontally (when the temperature difference ΔT=T1−T2 is 0° C.) and is thus simulated so that gravity acts on the VIG unit.
Temperature difference between T1 and T2: about 60° C.
The hotter side (S2) was set to be the lamination glass side and hence the lamination glass sheet provides the outer major surface S2 in FIG. 10.

For the computer simulation model, a temperature difference/gradient profile was established in accordance with temperatures measured across the hotter/heated side. This profile was based on temperature measurements provided during the test described below. This profile was used in the simulation model for the hotter side. The lamination interlayer was a PVB material.

Under these conditions, the simulation results defined that the distance DIS4 from the centre part 52 of the longer edge 50b would be 7.82 mm from the plane P1 (DIS4).

Moreover, under these conditions, the simulation results defined that the distance DIS4 from the centre part 52 of the shorter edge 50c would be 5.15 mm from the plane P1.

FIGS. 11 and 12 are images of a test of a thermal deflection of a laminated VIG unit 3 having substantially the parameters as defined above with regard to FIG. 10. The VIG unit 3 was placed horizontally to support on support surfaces 61a of a plurality of support rods 61 of a support frame 60. The VIG unit 3 supported initially, when the temperature difference ΔT=T1−T2 was substantially 0° C., on substantially all support surfaces of the frame 62 on which the VIG unit was arranged.

An infrared heat radiation arrangement 63 was arranged above the upper glass sheet, i.e. the lamination glass sheet, and covered the upper glass sheet to a bit beyond the side surfaces 7 of the VIG unit 3. Then the heating arrangement 63 started to heat the upper glass sheet 70 of the VIG unit 3, so that the upper glass sheet reached a maximum temperature of approx. 100° C., and the lower glass was measured to have a temperature of approximately 35° C. It was expected and validated that the temperature of the heated glass facing the radiation heater varied over the surface due to cold bridges caused by among others the edge seal of the VIG unit. Hence, no completely uniform heating was obtained (as opposed to the simulation results), but the maximum temperature measured at the heated glass sheet was about 100° C., and for the majority of the heated surface, the temperature was determined to be above at least 85° C. and at many locations above 90° C.

The present inventors could after the heating by the infrared heating arrangement visually see and confirm a formation of an edge deflection curve DC between the VIG unit corners 51. This provided a maximum edge deflection DIS4 of the VIG unit due to the forced temperature difference ΔT=T1−T2, when compared to the temperature difference ΔT=T1−T2 of substantially 0° C. The distance DIS4 was determined by a first reference point defined by a support surface 61a (that was used as a reference for the plane P1), and the lower surface of the VIG unit 3, in a direction substantially perpendicular to the plane P1.

The maximum edge deflection DIS4 of the long edge 50b (FIG. 16) was measured to be approximately 7.4, or more precisely 7.43 mm at the forced temperature difference, when compared to the temperature difference ΔT=T1−T2 of substantially 0° C.

FIG. 12 illustrates the edge deflection of the shorter edge 50c of the same VIG unit as tested in FIG. 11. Here, in a similar way, the shorter edge 50c described an edge deflection curve DC due to the forced heating and the temperature difference between T1 and T2. Additionally, the maximum edge deflection DIS4 of the edge 5b was measured to be approximately 5.3, or more precisely 5.33 mm, at the forced temperature difference, when compared to the temperature difference ΔT=T1−T2 of substantially 0° C.

Accordingly the maximum tested edge deflection DIS4 vs the simulated edge deflection resulted in the values of table 1 below.

TABLE 1

| | Simulated edge deflection DIS4 | Edge deflection test (FIGS. 15-16) DIS4 |
|---|---|---|
| Longer edge 50b | 7.82 mm | 7.43 mm |
| Shorter edge 50c | 5.15 mm | 5.33 mm |

The inventors concluded that the test illustrated in FIGS. 11-12 validated the computer simulations, and thus confirmed that the VIG unit computer simulations was sufficiently precise and reliable.

Additionally, the test approved that the edges of larger size laminated VIG units having rigid edge seals 11 provided by fused edge seal material such as solder glass or a metal solder, when subjected to a larger temperature difference, will tend to provide/describe an edge deflection curve/arc DC (see e.g. FIGS. 8 and 9) that causes a substantial edge deflection DIS4 in an un-constricted situation where no "outer" mechanical forces constrains the edge deflection. This also applies in laminated VIG units and VIG units without a laminated sheet.

The above disclosure is generally described as relating to a building aperture cover in the form of architectural aperture coverings, more particular in the form of window solutions. It is generally understood that these window solutions may e.g. be for vertical windows where the VIG unit is arranged with a plane P1 arranged with an angle of substantially 90° compared to horizontal. In further aspects of the present disclosure, the window is a roof window where the VIG unit 3 is arranged with an angle different from vertical, for example where the plane P1 is arranged with an angle between 5° and 90°, such as between 10° and 75° or 5° and 85°, compared to horizontal, or substantially completely horizontally. It is however understood that the solutions disclosed above may also be used in architectural aperture coverings in the form of doors comprising windows.

While the present disclosure has been described in detail in connection with only a limited number of embodiments or aspects, it should be readily understood that the present disclosure is not limited to such disclosed embodiments or aspects. Rather, the present disclosure can be modified to incorporate any number of variations, alterations, substitutions or equivalent arrangements not heretofore described, but which are commensurate in scope with the present disclosure. Additionally, while various embodiments or aspects of the present disclosure have been described, it is to be understood that aspects of the present disclosure may include only some of the described embodiments or aspects or combinations of the various embodiments or aspects. Accordingly, the present disclosure is not to be seen as limited by the foregoing description.

The invention claimed is:

1. A roof window with a vacuum insulated glass unit, wherein the window comprises:
    a vacuum insulated glass unit comprising a first glass sheet and a second glass sheet, wherein an evacuated gap is placed between the first and second glass sheets, wherein a plurality of support structures are distributed in the evacuated gap, and wherein an edge seal encloses the evacuated gap,
    a frame arrangement comprising a fixation frame and a sash fixed to a vacuum insulated glass unit, and wherein the sash is movably connected to the fixation frame by means of a hinge connection so that a top end part of the sash is configured to move inwards and a bottom end part of the sash is configured to move outwards when opening the sash from a closed position, wherein the bottom end part of the sash comprises an elongated, structural bottom member having an inner surface facing towards the top end part of the sash, and an opposite exterior surface facing away from the top end part, wherein the vacuum insulated glass unit comprises an overlapping part, where the evacuated gap overlaps the elongated, structural bottom member of the sash, and wherein said overlapping part of the vacuum insulated glass unit moreover overlaps at least a part of an elongated bottom frame member of the fixation frame.

2. A roof window according to claim 1, wherein the vacuum insulated glass unit comprises a part extending beyond an outermost edge of said elongated structural bottom member of the sash which faces away from the top end part of the sash, and wherein said part of the vacuum insulated glass unit extending beyond the outer edge moreover overlaps at least a part of the elongated bottom frame member when the sash is in the closed position.

3. A roof window according to claim 2, wherein the vacuum insulated glass unit comprises a sealed evacuation opening and/or a getter inside the evacuated gap which is/are placed at the overlapping part of vacuum insulated glass unit which extends beyond the outermost edge of said elongated structural bottom member of the sash and overlaps at least a part of the elongated bottom frame member.

4. A roof window according to claim 1, wherein the elongated bottom frame member comprises a surface facing a frame opening defined by the fixation frame, and an opposite, exterior surface facing away from the frame opening, and wherein the surface facing the frame opening is arranged to face and be opposite to the exterior surface of the structural bottom member of the sash when the sash is in the closed position.

5. A roof window according to claim 1, wherein the vacuum insulated glass unit comprises a sealed evacuation opening and/or a getter arrangement inside the evacuated gap which is/are placed at the overlapping part of vacuum insulated glass unit that overlaps the structural bottom member of the sash.

6. A roof window according to claim 1, wherein the evacuated gap has a width which is below 0.5 mm.

7. A roof window according to claim 1, wherein a distance from the bottom edge surface of the vacuum insulated glass unit and to a line of sight through the vacuum insulated glass unit is between 25 mm and 200 mm, wherein the distance is determined parallel to an outer major surface of the vacuum insulated glass unit, in a direction perpendicular to a longitudinal extent of the bottom edge surface.

8. A roof window according to claim 1, wherein a cladding wall is connected to the vacuum insulated glass unit and is configured to extend over a part of an exterior surface of the bottom frame member facing away from a frame opening when the sash is in the closed position.

9. A roof window according to claim 1, wherein an overlapping cover, such as a hiding cover plate, is fixed to the vacuum insulated glass unit and/or the sash, and is arranged to cover and hide at least the overlapping part of the vacuum insulated glass unit which overlaps the elongated bottom frame member.

10. A roof window according to claim 1, wherein a masking is provided to mask the overlapping part of the vacuum insulated glass unit which overlaps the structural bottom member of the sash and/or the overlapping part that overlaps the elongated bottom frame member of the fixation frame.

11. A roof window according to claim 10, wherein the masking is a sheet, plate or coating.

12. A roof window according to claim 1, wherein a top end part of the frame arrangement comprises a top cladding device configured to extend from the fixation frame and over the top end part of the sash, at least when the sash is in the closed position.

13. A roof window according to claim 1, wherein the top end part of the sash comprises an elongated, structural top member having an inner surface facing towards the bottom end part of the sash, and an opposite outer surface facing away from the bottom end part, wherein the vacuum insulated glass unit comprises an overlapping part which overlaps the structural top member of the sash.

14. A roof window according to claim 1, wherein upper and lower elongated water cover members are configured to cover elongated side sash members and elongated side members of the fixation frame, wherein the upper elongated water cover members are stationary and fixed to the fixation frame, and wherein the lower elongated water cover members are fixed to the sash or the vacuum insulated glass unit and thereby configured to move together with the sash.

15. A roof window according to claim 1, wherein the vacuum insulated glass unit comprises a tempered glass sheet providing the first or second glass sheet of the vacuum insulated glass unit, and wherein the vacuum insulated glass unit is a laminated vacuum insulated glass unit comprising a lamination glass sheet configured to face an interior of a building.

16. A roof window according to claim 1, wherein an exterior surface of the vacuum insulated glass unit comprises an exposed, visible surface area which is larger than a visible, exposed surface area of an interior major surface of the vacuum insulated glass unit when the sash is in the closed position.

17. A roof window according to claim 1, wherein the vacuum insulated glass unit is attached to the elongated bottom sash member by means of a bonding seal attached to an interior major surface of the vacuum insulated glass unit.

18. A roof window (1) according to claim 17, wherein said bonding seal has a thickness above 4 mm, at a temperature difference between the two glass sheets of the vacuum insulated glass unit of substantially 0° C.

19. A roof window according to claim 1 wherein the hinge connection comprises a centre hinge connection.

20. A roof window according to claim 1, wherein a minimum distance between an outer major surface of the vacuum insulated glass unit and surfaces of elongated members of the sash facing the outer major surface, is at least 4 mm at a temperature difference between the two glass sheets of the vacuum insulated glass unit of substantially 0° C.

* * * * *